US011426789B2

(12) United States Patent
Duncan et al.

(10) Patent No.: US 11,426,789 B2
(45) Date of Patent: Aug. 30, 2022

(54) GROOVED FORGED CARBON STEEL FITTING APPARATUS AND METHODS OF MANUFACTURING THE SAME

(71) Applicant: US GROOVE AND FITTINGS, LLC, San Marcos, CA (US)

(72) Inventors: Thomas Edward Duncan, San Diego, CA (US); Dennis Raymond Miller, Julian, CA (US)

(73) Assignee: US GROOVE AND FITTINGS, LLC, San Marcos, CA (US)

( * ) Notice: Subject to any disclaimer, the term of this patent is extended or adjusted under 35 U.S.C. 154(b) by 355 days.

(21) Appl. No.: 16/579,253

(22) Filed: Sep. 23, 2019

(65) Prior Publication Data
US 2020/0088325 A1 Mar. 19, 2020

Related U.S. Application Data

(62) Division of application No. 13/417,077, filed on Mar. 9, 2012, now Pat. No. 10,458,577.

(Continued)

(51) Int. Cl.
*B21K 1/14* (2006.01)
*F16L 13/14* (2006.01)
(Continued)

(52) U.S. Cl.
CPC .................. *B21K 1/14* (2013.01); *B21K 1/16* (2013.01); *F16L 13/141* (2013.01); *F16L 43/001* (2013.01); *F16L 43/02* (2013.01)

(58) Field of Classification Search
CPC ... F16L 13/14; F16L 13/141; F16L 2013/145; F16L 43/001; F16L 43/02; B21D 17/04; B21D 3/14; Y10T 29/49444
See application file for complete search history.

(56) References Cited

U.S. PATENT DOCUMENTS 1,881,979 A * 10/1932 Hall .................. F16L 43/02
285/22
2,031,250 A * 2/1936 Brown ................ B21D 3/14
72/466.9
(Continued)

FOREIGN PATENT DOCUMENTS

JP 05052287 A * 3/1993 ............. B21D 17/04
SU 442869 7/1975

OTHER PUBLICATIONS

Victaulic, General Catalog, G-103-EUR 4769 REV N, Updated Aug. 2009, [online] [Retrieved on Jun. 20, 2014]. Retrieved from the internet: <URL: http://static.victtaulic.com/assets/uploads/literature/G-103-EU.pdf>.

(Continued)

*Primary Examiner* — Zachary T Dragicevich
*Assistant Examiner* — James A Linford
(74) *Attorney, Agent, or Firm* — Garson & Gutierrez, PC

(57) ABSTRACT

Roll grooved pipe fittings useful in the assembly of a variety of mechanically joined piping systems. These pipe fittings are roll grooved so that they can be mechanically joined directly with other like pipe fittings and/or with roll grooved straight pipe thereby substantially simplifying assembly. In addition, hybrid pipe fittings and systems are also disclosed. Methods and apparatus for manufacturing these aforementioned roll grooved pipe fittings are also disclosed and address both the roll grooving process itself, as well as various methodology and apparatus for correcting deformations that can occur as a result of the roll grooving process. Methods for using the aforementioned apparatus are also disclosed.

20 Claims, 23 Drawing Sheets

Related U.S. Application Data

(60) Provisional application No. 61/452,038, filed on Mar. 11, 2011.

(51) Int. Cl.
  *F16L 43/00* (2006.01)
  *F16L 43/02* (2006.01)
  *B21K 1/16* (2006.01)

(56) References Cited

U.S. PATENT DOCUMENTS

| | | | |
|---|---|---|---|
| 2,041,132 A | | 5/1936 | Johnson |
| 2,137,864 A | | 11/1938 | Hall |
| 2,821,415 A | | 1/1958 | Race |
| 3,015,502 A | | 1/1962 | Frost et al. |
| 3,501,939 A | * | 3/1970 | Remus .................. B21D 9/125 72/343 |
| 3,541,826 A | * | 11/1970 | Halliburton ............ B21D 17/04 72/105 |
| 3,685,131 A | * | 8/1972 | Fink ...................... F16L 15/008 29/417 |
| 4,311,248 A | | 1/1982 | Westerlund et al. |
| 4,522,434 A | | 6/1985 | Webb |
| 5,188,396 A | | 2/1993 | Calvin |
| 5,246,257 A | | 9/1993 | Kojima et al. |
| 5,979,202 A | | 11/1999 | Blakeley |
| 6,196,039 B1 | | 3/2001 | Williams et al. |
| 6,601,423 B1 | * | 8/2003 | Peterson .................. B21D 3/14 29/421.1 |
| 6,692,041 B1 | | 2/2004 | Coulas |
| 6,776,018 B2 | | 8/2004 | Hamm et al. |
| 7,401,819 B2 | | 7/2008 | Gibb et al. |
| 2005/0212284 A1 | | 9/2005 | Dole |
| 2010/0001514 A1 | | 1/2010 | Mikami |
| 2010/0001521 A1 | | 1/2010 | Vandal et al. |

OTHER PUBLICATIONS

Anvil International, Anvil Forged Carbon Steel Fittings & Forged Steel Unions: Screwed and Socket Welding, Price Sheet CSF-9.06 & U-9.06, Effective: Sep. 4, 2006. [online][Retrieved on Dec. 11, 2014], Retrieved from the Internet:<URL: http://www.anvilintl.com/PDF/CSF-9.06%20and%20U-9.06.pdf>.
2012 Victaulic Company; AGS Grooved End Fittings, www.victaulic.com; 17 pages.
2014 Victaulic Company; Victaulic Long Radius Steel Elbows 3D, 5D and 6D; www.victaulic.com; 5 pages.

* cited by examiner

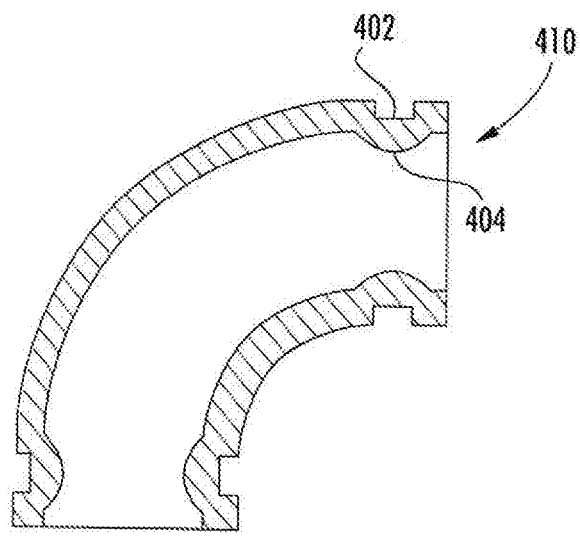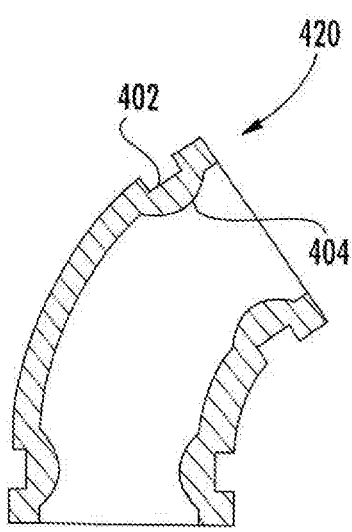
FIG. 4A          FIG. 4B
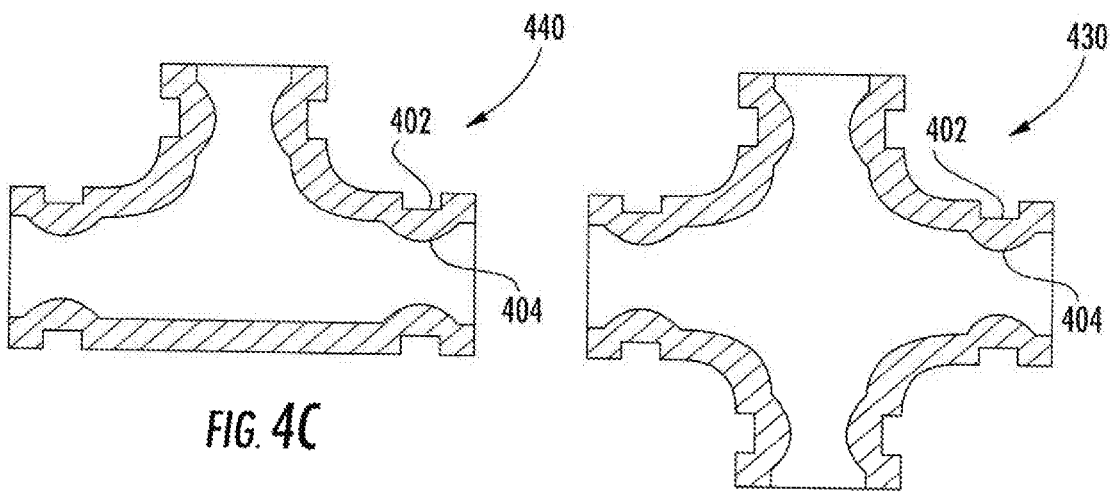
FIG. 4C          FIG. 4D

GROOVED FORGED CARBON STEEL FITTING APPARATUS AND METHODS OF MANUFACTURING THE SAME

PRIORITY

This application is a divisional of, and claims the benefit of priority to, U.S. patent application Ser. No. 13/417,077 filed Mar. 9, 2012 and entitled "Grooved Pipe Fitting Apparatus and Methods of Using and Manufacturing the Same", which in turn claims priority to U.S. Provisional Patent Application Ser. No. 61/452,038 filed Mar. 11, 2011 of the same title, each of which being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to the area of grooved mechanical joining systems, and more specifically in one exemplary aspect to improved apparatus and methods of manufacturing relating to the use of grooved pipe fittings in, e.g., a piping system.

DESCRIPTION OF RELATED TECHNOLOGY

Mechanically joined piping systems are well known in a variety of industries and for a variety of applications involving the movement of various fluids. Mechanically joined piping systems are in many instances more cost-effective to install then alternative piping systems such as welded piping systems as it generally requires less skilled labor for installation as well as requires less time to install over welded assembly techniques.

FIG. 1 illustrates a cross sectional view of two (2) roll-grooved carbon steel pipes 102 that are coupled to one another using a mechanical joining apparatus 100. The carbon steel pipes are typically manufactured to ASTM A53A, B, OR C ERW or A106 seamless steel standard that allows the material to be, inter alfa, welded, cut with a torch, drilled, tapped and grooved in the field. The carbon roll-grooved carbon steel pipes are separated by a gap 108 and are coupled using a coupling 104 fitted with a gasket 106. These couplings are typically bolted around the carbon steel pipes to be joined and have at least a portion of the coupling positioned within the rolled groove 110 of the carbon steel pipes themselves. While roll-grooved pipe is useful for straight carbon steel pipes, the process is complicated when various fittings (e.g., elbows, tees, crosses, wyes, caps, laterals, and reducers (concentric or eccentric)) need to be utilized with the aforementioned roll-grooved pipe.

FIG. 2 illustrates a cross sectional view of one such mechanically joined pipe fitting 200 as it exists in the prior art. Specifically, FIG. 2 illustrates a straight portion of carbon steel pipe 102 joined to an elbow pipe fitting 202. The carbon steel pipe 102 includes a rolled groove 210 while the elbow 202 includes a groove 212 that is formed using either: (1) a casting process; or (2) a machining process. The carbon steel pipe and fitting are subsequently connected using a standard coupling 204 with an accompanying gasket 206. In applications where casting processes are used, the elbow fitting is typically made from ductile cast iron material. While the cast iron fitting is effective in performing its intended function, the overall mechanical strength of the ductile cast iron possesses less strength than an equivalent carbon steel elbow, while also having a much higher cost than a welded carbon steel elbow. For example, a carbon steel elbow that is joined using a welding process might cost on the order of about $5 USD, while an equivalent cast elbow pipe fitting would cost on the order of about $27 (see also Appendix A which illustrates exemplary relative cost differences between welded pipe fittings and equivalent cast iron (grooved) pipe fittings).

In addition, ductile cast iron is generally not well suited for modification in the field as it is difficult to machine, and is otherwise not suitable for other modification processes such as welding or tapping.

Alternatively, in applications where a cut-grooved carbon steel fitting is used, the portion 212 where the groove is machined into the carbon steel elbow possesses much less strength than an equivalent groove made from a roll-grooving technique due in part to the comparatively smaller amount of material (i.e., the material removed during machining) present in the grooved area.

In addition, the machining process is substantially complicated due to the various complicated geometries of the various fittings used in piping systems, thereby often necessitating skilled machinists and/or specialized tools for manufacture.

FIG. 3 illustrates an alternative to the mechanically joined system of FIG. 2 in which a carbon steel elbow fitting 302 is joined to a straight carbon steel pipe 304 by a welded joint 306. While the carbon steel elbow of the welded system 300 of FIG. 3 is less costly, in terms of material costs, the assembly process is substantially more complicated and costly then a mechanically joined system as welding processes require skilled welders. In addition, the welding process is much more time consuming then an equivalent mechanically joined system.

Accordingly, despite the foregoing wide variety of joining systems in the prior art, there remains an unsatisfied need for an improved pipe fitting system that: (i) is less costly to produce then a cast or machined pipe fitting, (ii) is easier to assemble then a welded pipe fitting, (iii) possesses greater mechanical strength than an equivalent cast or machined pipe fitting, and/or (iv) is easier to modify in the field then an equivalent cast pipe fitting.

SUMMARY OF THE INVENTION

The invention satisfies the aforementioned needs by providing improved roll grooved pipe fitting apparatus, as well as methods for manufacturing and using the same. In a first aspect of the invention, a roll-grooved pipe fitting is disclosed. In one embodiment, the roll-grooved pipe fitting is a forged pipe fitting that includes two or more peripheral openings with at least one of the peripheral openings having a roll grooved feature that facilitates the forged pipe fittings coupling with other roll grooved apparatus. The forged pipe fitting either: (1) includes a bend between the two or more peripheral openings; or (2) includes three or more peripheral openings.

In a second embodiment, the forged pipe fitting includes a roll grooved feature that facilitates the forged pipe fittings coupling with other roll grooved apparatus.

In a second aspect of the invention, a hybrid pipe fitting is disclosed. In one embodiment, the hybrid pipe fitting includes both a roll-grooved end and another end suitable for welding.

In a third aspect of the invention, a mechanically joined system is disclosed. In one embodiment, the mechanically joined system includes a roll-grooved carbon steel pipe and a roll-grooved carbon steel fitting.

In a fourth aspect of the invention, methods of manufacturing the aforementioned roll-grooved pipe fitting and system are disclosed.

In a fifth aspect of the invention, methods of assembling the aforementioned mechanically joined system are disclosed.

In a sixth aspect of the invention, tools which manufacture the aforementioned roll-grooved pipe fitting are disclosed.

In a seventh aspect of the invention, hybrid systems that utilize both roll-grooved joints and non roll-grooved joints are disclosed.

In an eighth aspect of the invention, business methods associated with the aforementioned apparatus, system and methods are disclosed.

BRIEF DESCRIPTION OF THE DRAWINGS

The features, objectives, and advantages of the invention will become more apparent from the detailed description set forth below when taken in conjunction with the drawings, wherein:

FIG. 4A is a cross-sectional view of an exemplary roll grooved ninety-degree elbow pipe fitting in accordance with the principles of the present invention.

FIG. 4B is a cross-sectional view of an exemplary roll grooved forty-five degree elbow pipe fitting in accordance with the principles of the present invention.

FIG. 4C is a cross-sectional view of an exemplary roll grooved tee pipe fitting in accordance with the principles of the present invention.

FIG. 4D is a cross-sectional view of an exemplar roll grooved cross pipe fitting in accordance with the principles of the present invention.

FIG. 6A-1 and FIG. 6A-2 are collectively a multi-view projection of a leverage bar for use with ninety degree elbow pipe fitting in accordance with the principles of the present invention.

FIG. 6G-1 and FIG. 6G-2 are collectively a multi-view projection illustrating a flare out condition in cross-section along with an exemplary tool for correcting flare out conditions in accordance with the principles of the present invention.

FIG. 6I is a top view of the alternative tool of FIG. 6H in accordance with the principles of the present invention.

DETAILED DESCRIPTION OF THE INVENTION

Figure 1:
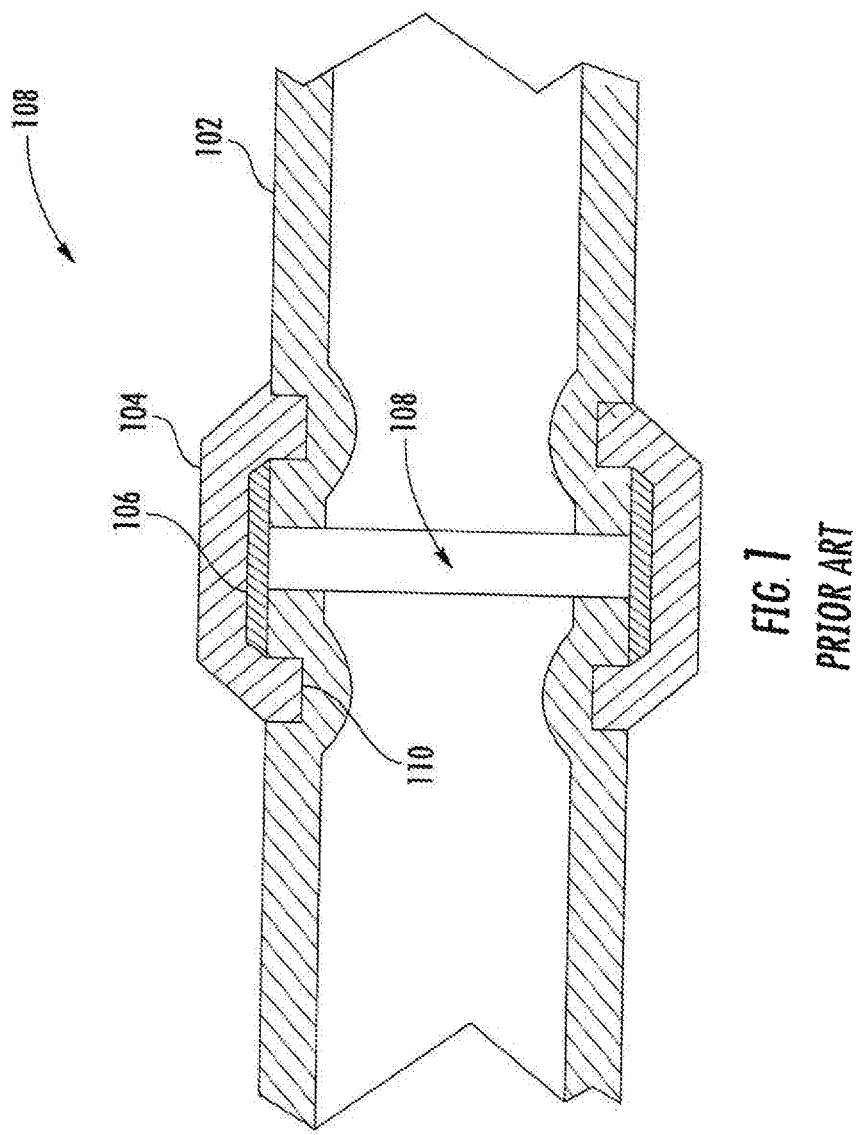
FIG. 1 is a cross-sectional view of an exemplary prior art mechanically coupled roll grooved pipe system.

Reference is now made to the drawings wherein like numerals refer to like parts throughout.

Overview

In one salient aspect of the invention, various pipe fittings that are used in the assembly of a variety of mechanically joined piping systems are roll-grooved so that they can be mechanically joined directly with other like pipe fittings and/or roll grooved straight pipe, thereby substantially simplifying assembly.

In addition, the aforementioned roll grooved pipe fittings could also be used as hybrid components, whereby one or more joints are joined using a welding technique while other joint(s) on the same pipe fitting can be used using a mechanically joined method.

Moreover, as the variety of materials that can be used is increased with the aforementioned roll grooved pipe fitting, the materials that can be chosen can be: (1) less expensive to procure; and/or (2) easier to modify in the field, thereby substantially improving the productivity of the installers who install these mechanically joined piping systems.

Methods and apparatus for manufacturing these aforementioned roll grooved pipe fittings are also disclosed, which address both the roll grooving process itself, as well as various methodology and apparatus for correcting deformations (e.g., out of round conditions, flare-out conditions, etc.) that can occur as a result of the roll grooving process.

Methods for using the aforementioned apparatus are also disclosed.

Exemplary Embodiments

Exemplary embodiments of the apparatus and methods of the present invention are now described in detail. It will be appreciated that while the roll-grooved pipe fittings described herein are primarily manufactured from carbon steel in compliance with ASTM A234/A234M, other materials or alloys including without limitation stainless steel, copper, and aluminum could be readily substituted, the use of carbon steel merely being exemplary.

Moreover, it will be appreciated that while the various embodiments shown and described herein are described primarily in the context of standard weight pipe thicknesses up to about three-eighths (⅜) of an inch thick (depending on the overall diameter of the fitting), it is appreciated that larger non-standard pipe thicknesses can also benefit from the machinery and manufacturing processes described herein.

Roll-Grooved Fitting Apparatus

Referring now to FIGS. 4A-4D, various pipe fittings are illustrated in cross-section so that the respective geometry of the various grooves are more easily visible. FIG. 4A illustrates an exemplary ninety-degree (90°) elbow pipe fitting 410. The pipe fitting illustrated in FIG. 4A is preferably manufactured from carbon steel in compliance with ASTM A234/A234M. The elbow includes a rolled groove 402 that is present on both ends of the elbow. In addition, the elbow also included a deformed portion 404 that is resultant from the roll-grooving process described subsequently herein with respect to FIGS. 5-5A. FIG. 4B illustrates an alternative elbow variant comprised of a forty-five degree (45°) elbow fitting 420 with accompanying grooves 402 and deformed portions 404. Similarly, FIG. 4C illustrates a tee pipe fitting 440 with accompanying grooves 402 and deformed portions 404 while FIG. 4D illustrates a cross pipe fitting 430 with accompanying grooves 402 and deformed portions 404.

In addition to those pipe fittings illustrated with respect to FIGS. 4A-4D, other pipe fittings that are roll-grooved are envisioned and include, without limitation: (1) drain elbows (i.e., elbows with a tapped hole or welded thread-o-let); (2) standard or custom angled elbows (e.g. twenty two and a half degree (22.5°) elbows; eleven and a quarter degree elbows (11.25°), etc.); (3) long radius elbows; (4) reducing base support elbows; (5) adapter elbows; (6) reducing tees; (7) reducing crosses; (8) laterals; (9) tee wyes; (10) true wyes; (11) reducing laterals; (12) reducing tee wyes; (13) caps; (14) bull plugs; (15) concentric reducers; and (16) eccentric reducers, etc. Additionally, hybrid pipe fittings (not shown) are also envisioned, which include both a roll-grooved interface and an interface suitable for well-known welding processes.

Furthermore, because the application of the roll-grooving processes described herein can readily be applied to virtually any type of fitting, customization of fittings is now possible. For example, a standard ninety degree (90°) elbow can be cut to almost any desirable angle (e.g. twenty-nine degrees (29°)) and a rolled groove can then subsequently be added to the cut end. Such customization has heretofore been unachievable. With the growing diversity of complex geometries in today's architectural designs, the ability to easily produce custom roll-grooved fittings presents a tremendous time and cost advantage over prior art cast fittings.

Manufacturing Methodology

Figure 5:
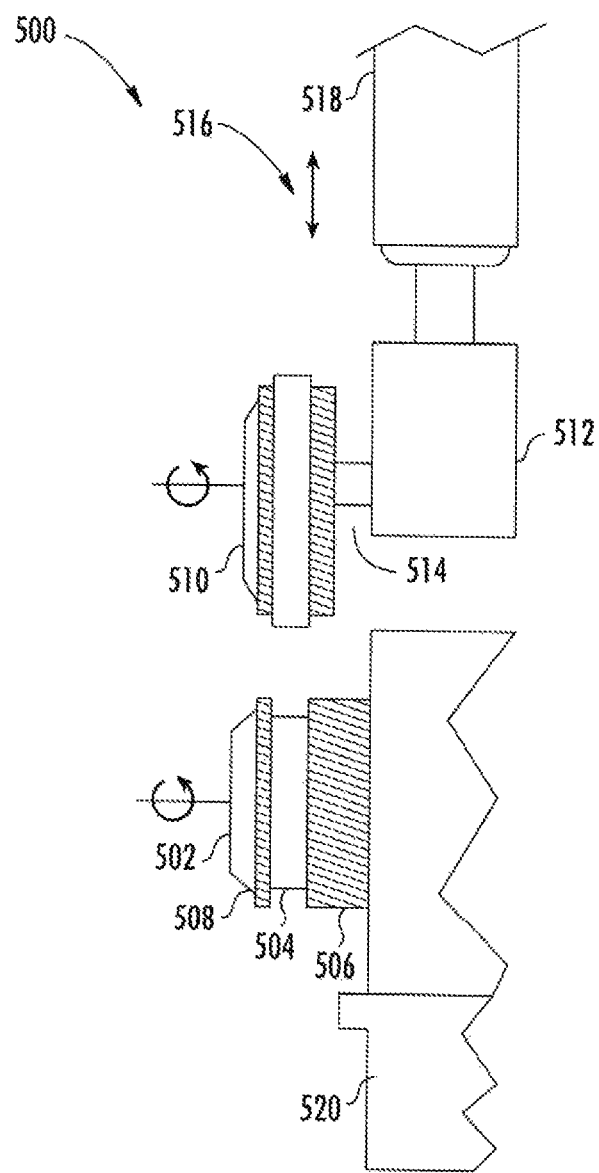
FIG. 5 is an elevation view of an exemplary roll grooving apparatus in accordance with the principles of the present invention.

Referring now to FIG. 5, a hydraulic roll grooving apparatus 500 useful in manufacturing the roll-grooved fitting apparatus discussed previously herein is shown and described in detail. The roll grooving apparatus is generally similar in construction to that disclosed in U.S. Pat. No. 3,903,722 to Thau, Jr., et al. filed on Jun. 28, 1974 and entitled "Roll Grooving Tool", the contents of which are incorporated herein by reference in its entirety, although other approaches may be used with equal success.

In its simplest form, the hydraulic roll grooving apparatus includes a grooving roll 510 that is allowed to rotate about shaft 514. The shaft 514 is contained within machine body 512 that is further designed to actuate along the Z-axis 516 and is driven by a hydraulic actuator 518. Opposite the grooving roll 510 is a backup roll 502. The backup roll includes a knurled outer surface 506 on its outer diameter (i.e., the surface adapted to engage the interior of the fitting to be roll grooved). The backup roll also includes a relief cavity 504 that is sized to accommodate the deformed portion of the grooves shown in, for example, FIGS. 4A-4D. The front face of the backup roll also includes a relief feature 508 (such as a chamfer) that is sized so as to accommodate any obstructing features (such as a radius) present on the fitting to be roll grooved. Backup rolls are typically manufactured such that the two portions opposite the relief cavity 504 are symmetric in size. However, material needs to be removed (i.e., relief feature 508) in order to accommodate features that are present on various ones of pipe fitting geometry. Note that grooving roll also possesses a similarly manufactured relief feature on the front portion of the roll. A backstop 520 (which may be custom manufactured for example) is also included which helps maintain the fitting to be grooved in proper alignment during the roll grooving process. This custom manufactured backstop is machined so as fit under the backup roll while simultaneously providing support for the specific geometry of the pipe fitting to be roll grooved.

Figure 5A:
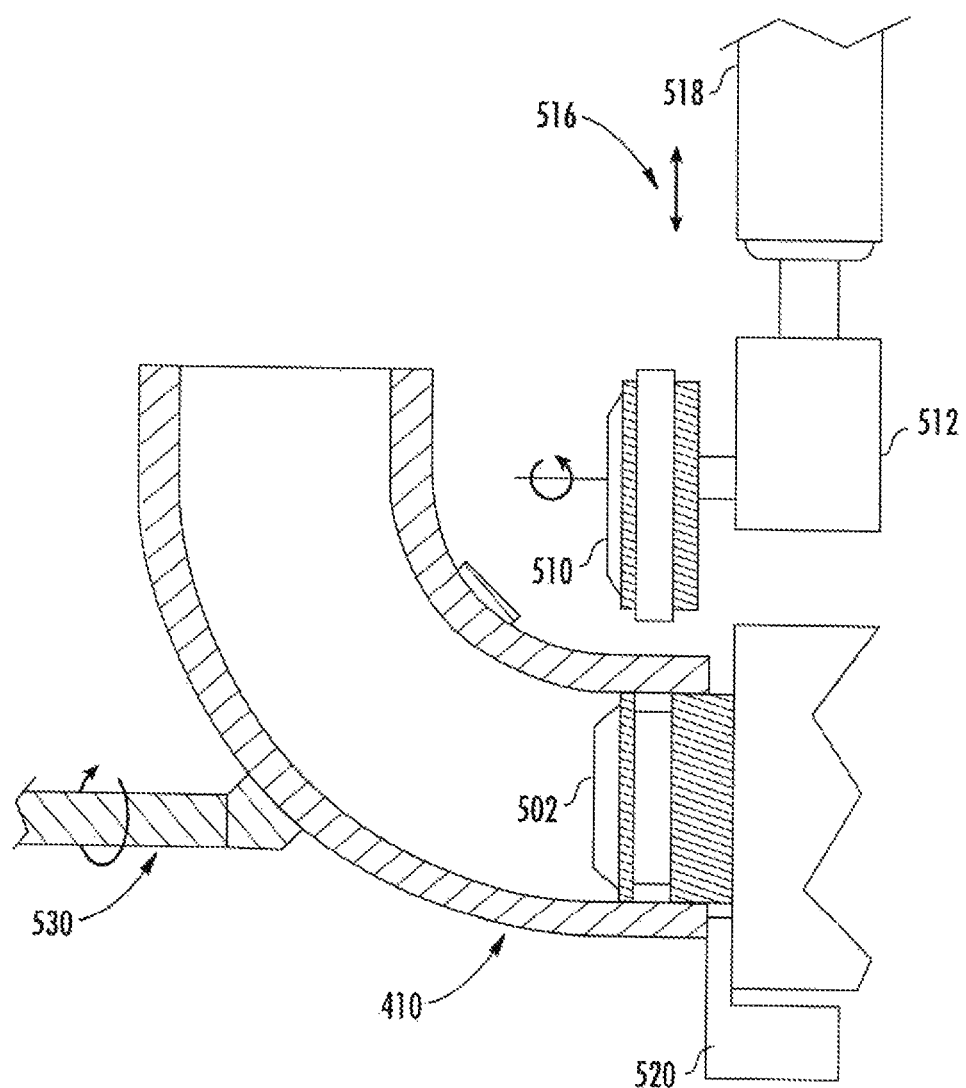
FIG. 5A is an elevation/cross-sectional view of an exemplary ninety-degree elbow pipe fitting roll grooving setup in accordance with the principles of the present invention.

Referring now to FIG. 5A, a machine set up for the manufacture of rolled grooves into a ninety degree (90°) elbow 410 is illustrated. The hydraulic roll grooving apparatus is as described previously with respect to FIG. 5, and includes a custom backstop created (i.e., fabricated) and sized to accommodate the specific geometry shown. A ninety degree (90°) elbow is illustrated as being installed over the backup roll 502. Installed around the ninety degree (90°) elbow is a leverage bar 530 (FIG. 6A) which will rotate as illustrated when the elbow is being roll grooved. Preferably, the leverage bar is configured so as to rotate about an axis that is collinear with the axis of rotation for the backup roll 502; however it is understood that in practice this can require significant effort to achieve. Accordingly, it is generally acceptable that the leverage bar merely maintains an orientation in which its longitudinal axis is generally parallel with the axis of rotation for the backup roll in lieu of the foregoing.

Figure 5B:
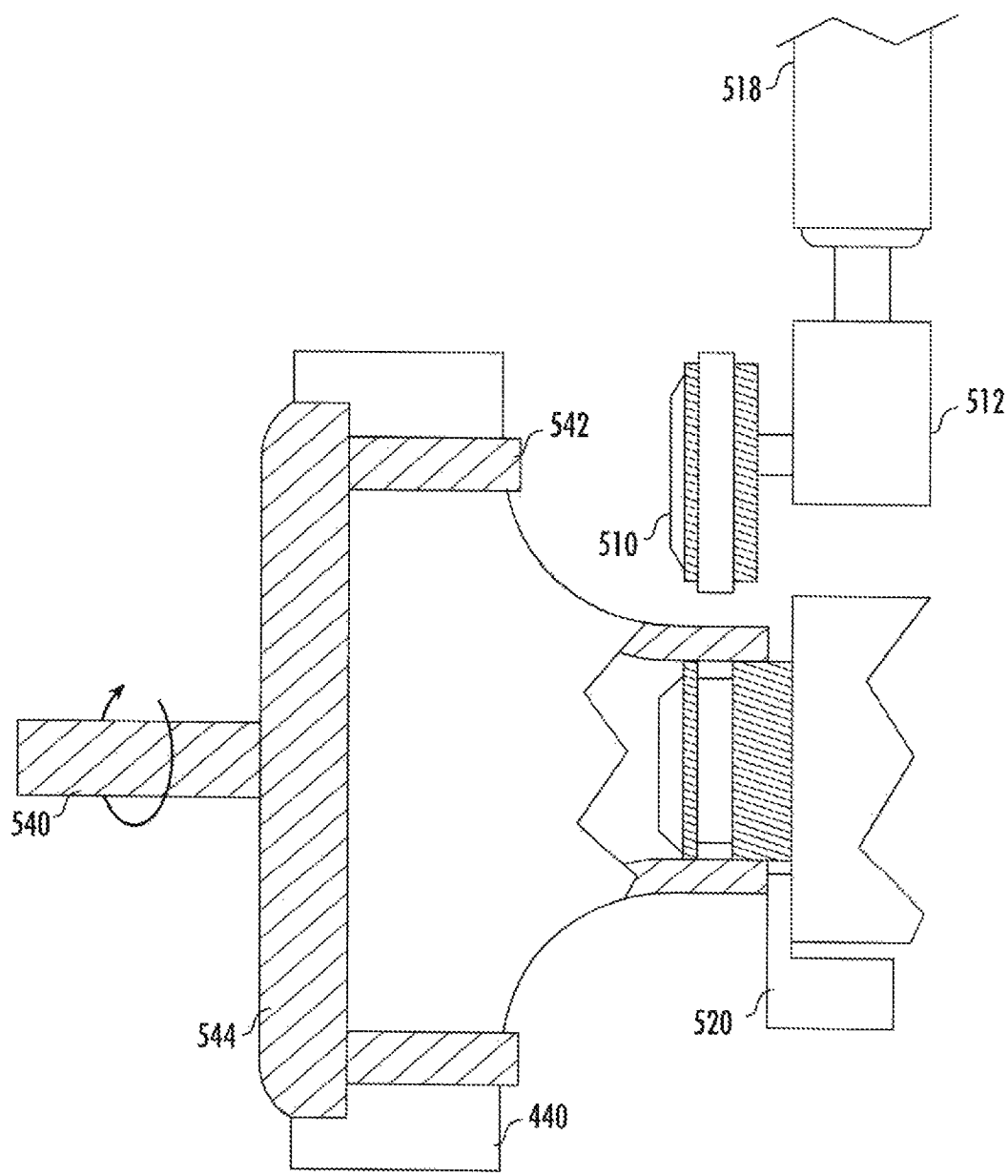
FIG. 5B is an elevation/cross-sectional view of an exemplary tee pipe fitting roll grooving setup in accordance with the principles of the present invention.

FIG. 5B illustrates a machine set up for the manufacture of rolled grooves into the orthogonal branch of a tee 440. Again, the backstop 520 is sized to accommodate the specific geometry of the tee fitting. The leverage bar 540 (FIG. 6B) includes an interface portion 544 sized to accommodate the outer surface shape of the tee fitting, and also includes clamps 542 which securely attach the tee fitting to the leverage bar during the roll grooving process. Again, the leverage bar is configured so that its axis of rotation is preferably collinear or parallel with the axis of rotation for the backup roll.

Figure 5C:
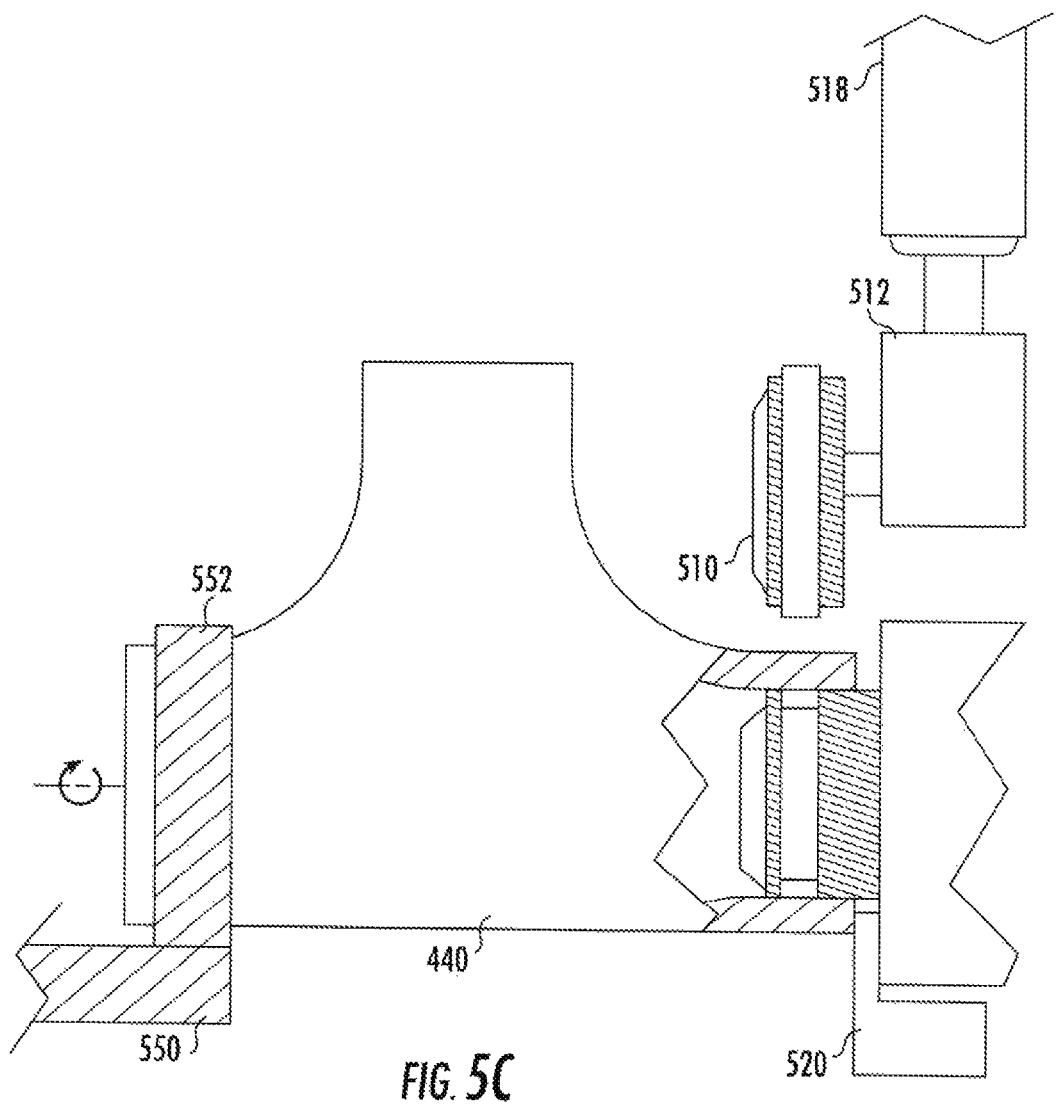
FIG. 5C is an elevation/cross-sectional view of an alternative tee pipe fitting roll grooving setup in accordance with the principles of the present invention.
Figure 5D:
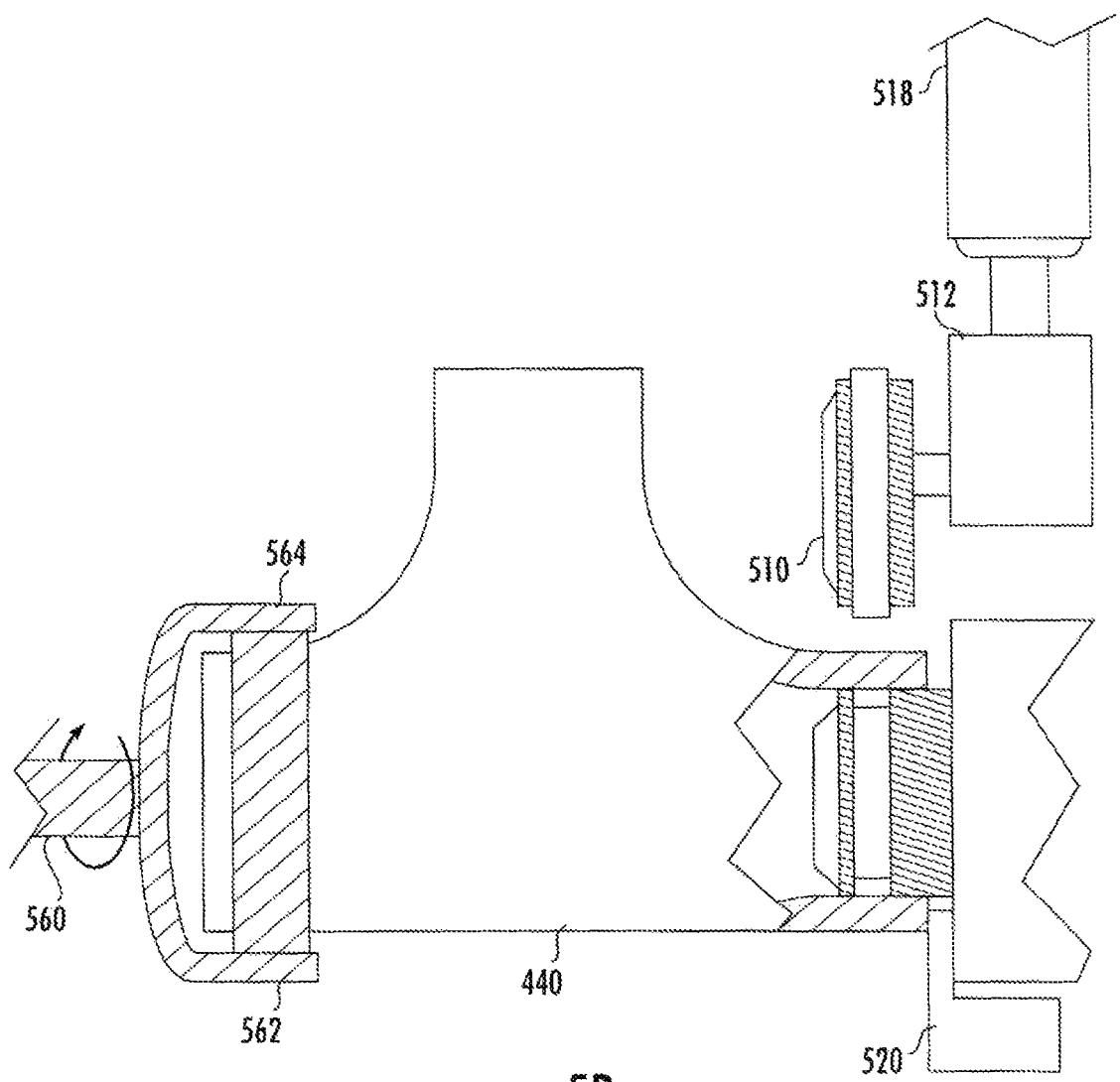
FIG. 5D is an elevation/cross-sectional view of yet another alternative tee pipe fitting roll grooving setup in accordance with the principles of the present invention.

FIG. 5C illustrates the roll grooving of the opposing openings for the tee fitting 440 shown in FIG. 5B and FIG. 4C. The leverage bar 550 is attached to an outer diameter portion of the tee fitting via a clamp 552. Accordingly, during the roll grooving process, the leverage bar will rotate about the axis of rotation for the backup roll, while simultaneously maintaining an orientation that is generally parallel with this axis of rotation. FIG. 5D illustrates a variant of the set up illustrated in FIG. 5C. However, in this illustrated embodiment, the leverage bar 560 includes a bracket 564 that in combination with the clamp portions 562 positions the leverage bar 560 so that it is generally concentric with the rotational axis of the backup roll.

Figure 2:
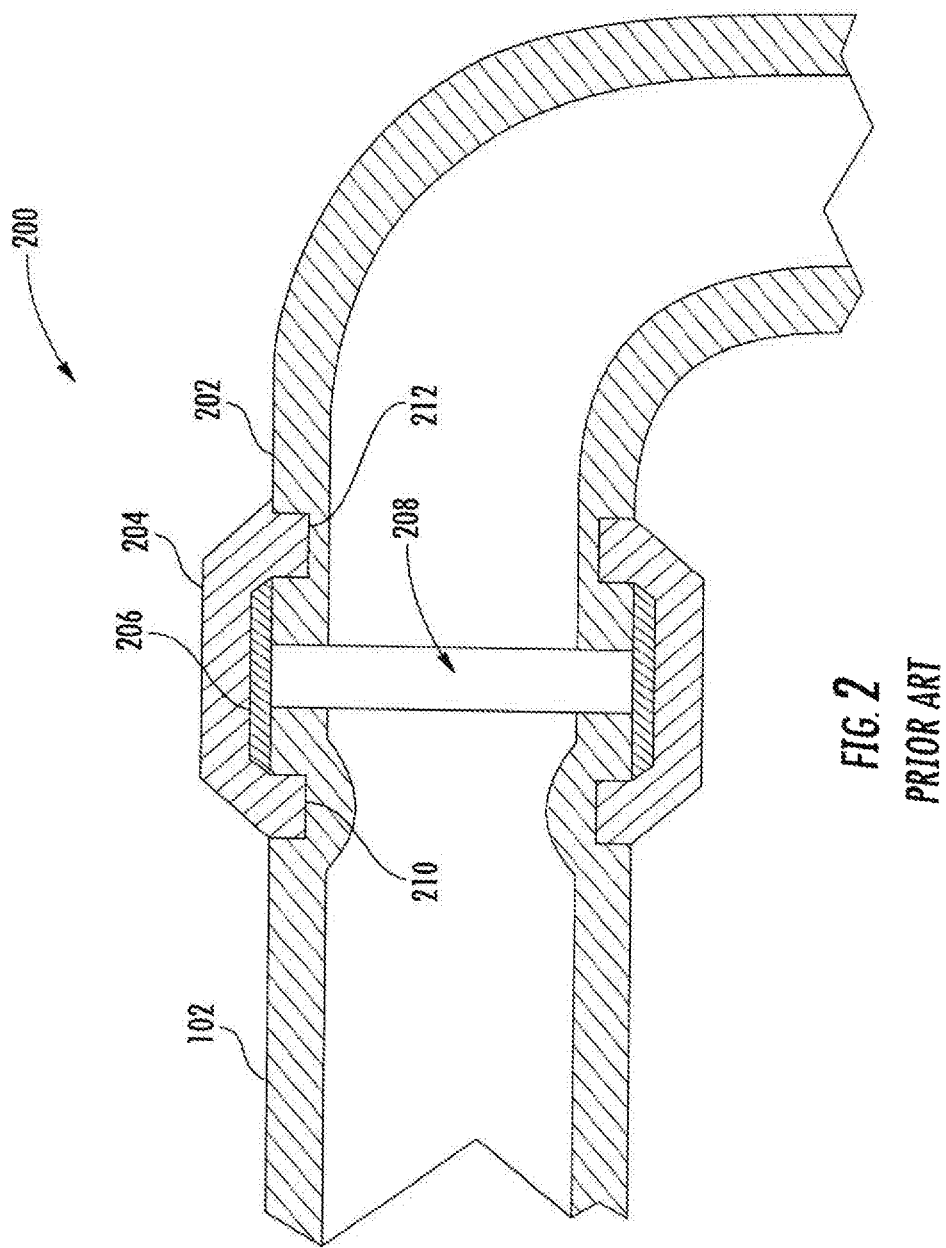
FIG. 2 is a cross-sectional view of an exemplary prior art mechanically coupled pipe fitting system.
Figures 1, 6A:
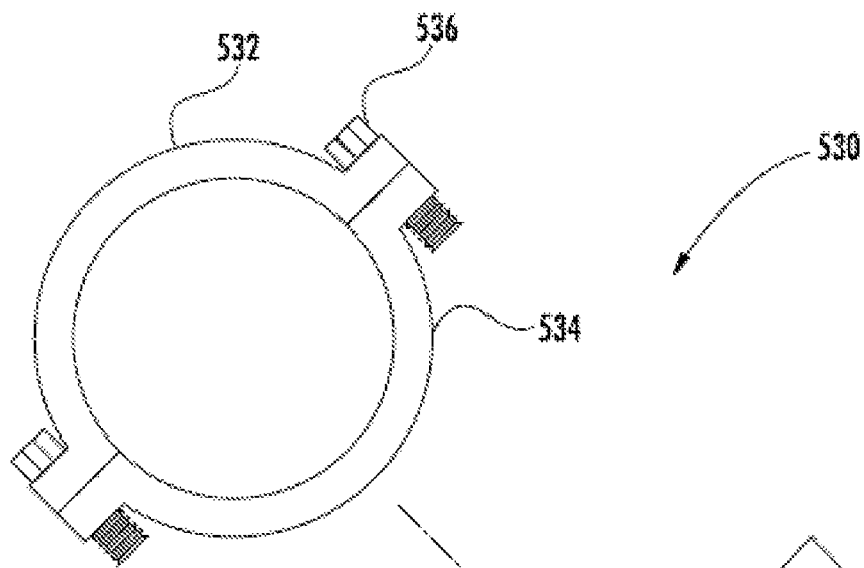
Figures 2, 6A:
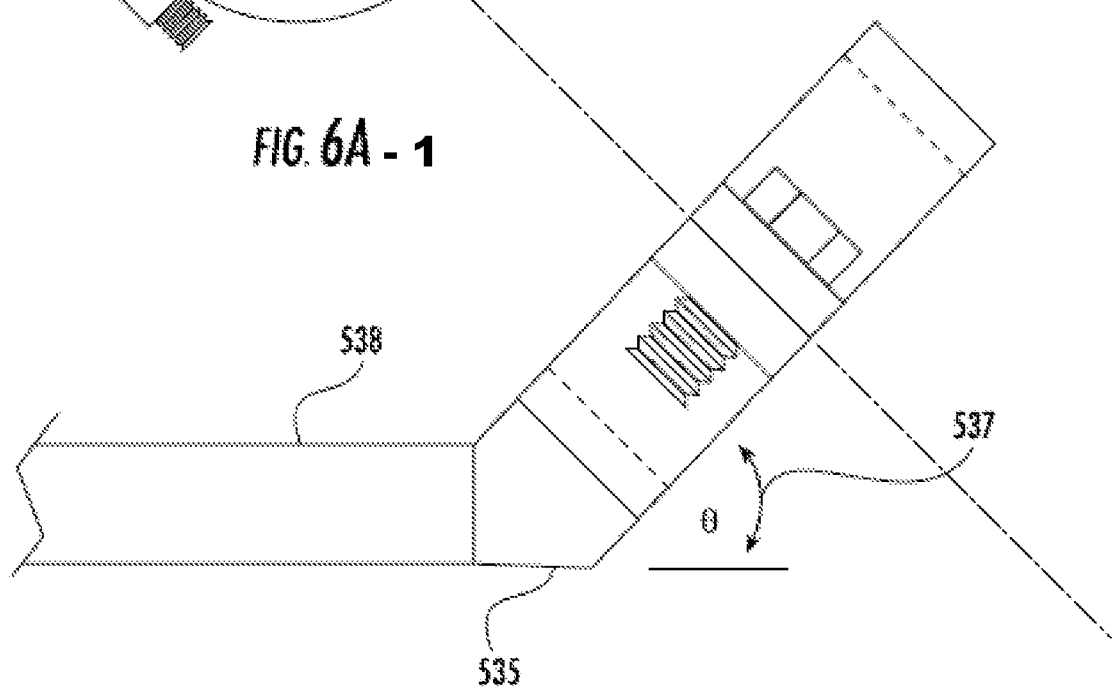

Referring now to FIGS. 6A-1 and 6A-2, an exemplary multi-view projection of the leverage bar 530 utilized in the machine set up illustrated in FIG. 5A is shown and described in detail. Specifically, as can be seen in FIG. 6A-1, the leverage bar includes an upper 532 and lower clamp 534 that are held together by bolts 536. These clamps are sized so as to accommodate the external periphery of the particular pipe fitting being roll grooved. In addition, and as can be seen in FIG. 6A-2 leverage bar handle 538 is positioned at a predetermined angle 537 with respect to the upper and lower clamps via a transition element 535 so that the desired relationship between the roll grooving apparatus and the leverage bar handle is maintained as discussed with regards to FIG. 5A supra.

Figure 6B:
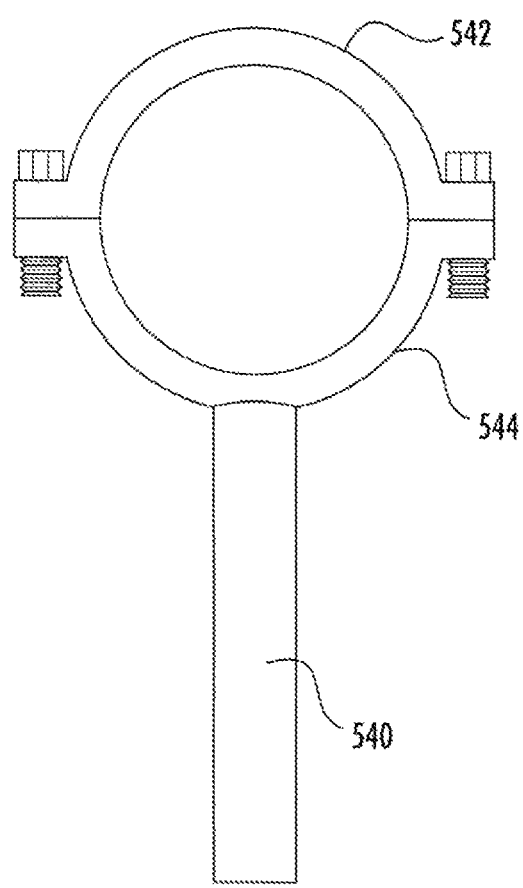
FIG. 6B is an end view of a leverage bar for use with tee pipe fittings in accordance with the principles of the present invention.

FIG. 6B illustrates an end view of the leverage bar 540 illustrated in the machine setup of the embodiment of FIG. 5B. The leverage bar includes an interfacing portion 544 that possesses a radius sized to accommodate the external periphery of the pipe fitting to be roll grooved. In addition, leverage bar clamps 542 are used to securely attach the leverage bar to the pipe fitting to be roll grooved.

Figure 6C:
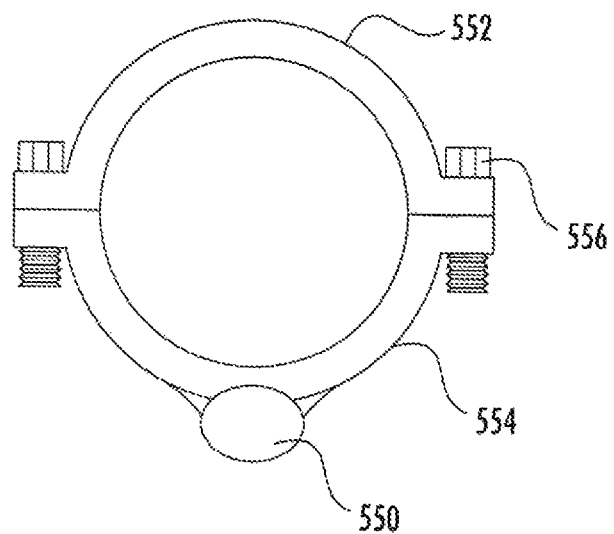
FIG. 6C is an end view of a leverage bar for use with, inter alfa, tee pipe fittings in accordance with the principles of the present invention.

FIG. 6C illustrates an end view of the leverage bar 550 illustrated in the machine setup of FIG. 5C. Similar to the leverage bar shown in FIG. 6A, the illustrated leverage bar includes an upper 552 and lower clamp 554 held together by bolts 556 and sized to accommodate the external periphery of the pipe fitting to be roll grooved. The leverage bar also includes a handle that is orthogonal to the clamps.

Figure 6D:
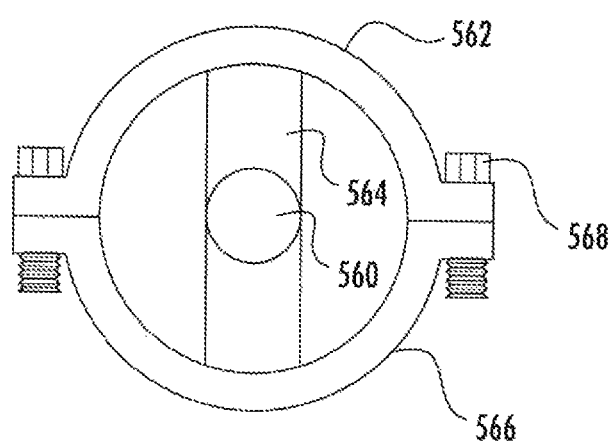
FIG. 6D is an end view of an alternative variant of the leverage bar illustrated in FIG. 6C.

FIG. 6D illustrates an end view of the exemplary embodiment of the leverage bar 560 illustrated in the machine setup of FIG. 5D and includes and upper 562 and lower clamp 566 that are coupled to one another via bolts 568. In addition, bracket 564 centers the leverage bar handle along the rotational axis in order to aid in the roll grooving of the attached pipe fitting (not shown).

Figure 6E:
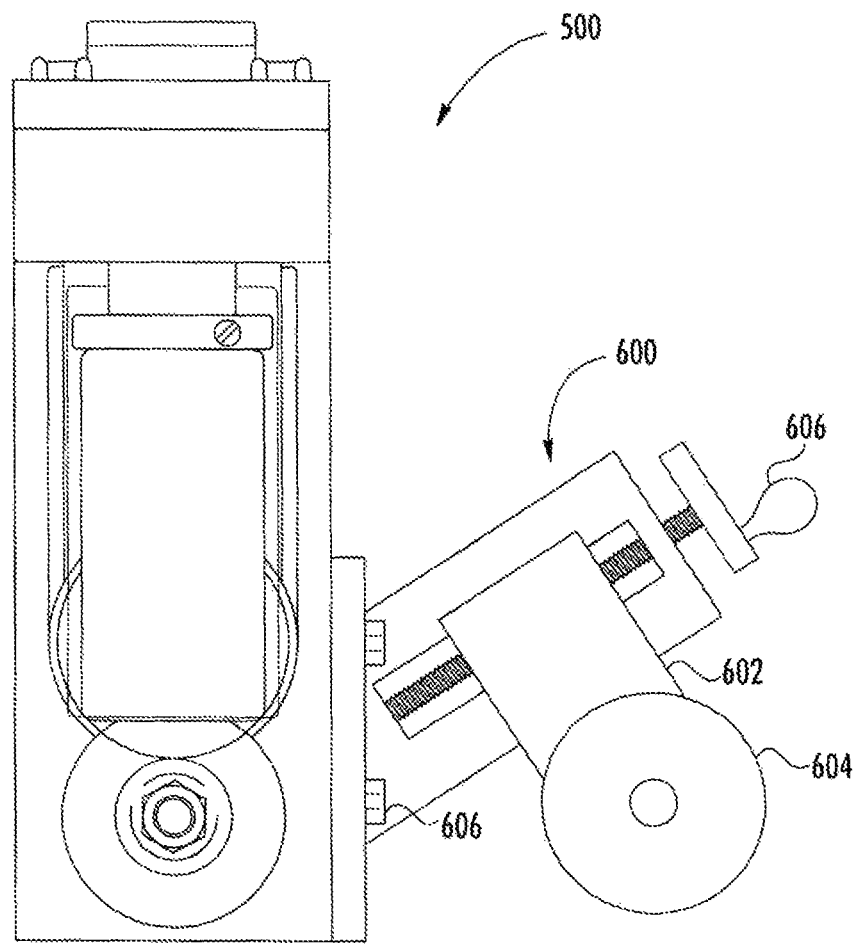
FIG. 6E is a front view of an exemplary idler wheel assembly mounted to a roll grooving apparatus in accordance with the principles of the present invention.

FIG. 6E illustrates an exemplary custom idler wheel assembly 600 useful in helping to maintain proper alignment of the pipe fittings being roll grooved using the roll grooving apparatus 500 illustrated in FIG. 5. The main body of the idler wheel assembly is secured to the roll grooving apparatus via a number of bolts 606. The adjustable portion 602 of the idler wheel assembly moves along a defined axis and is adjusted using hand crank 606 so that idler wheel 604 is in contact with the pipe fitting to be roll grooved. The idler wheel is also allowed to rotate freely when in contact with the pipe fitting.

Figure 6F:
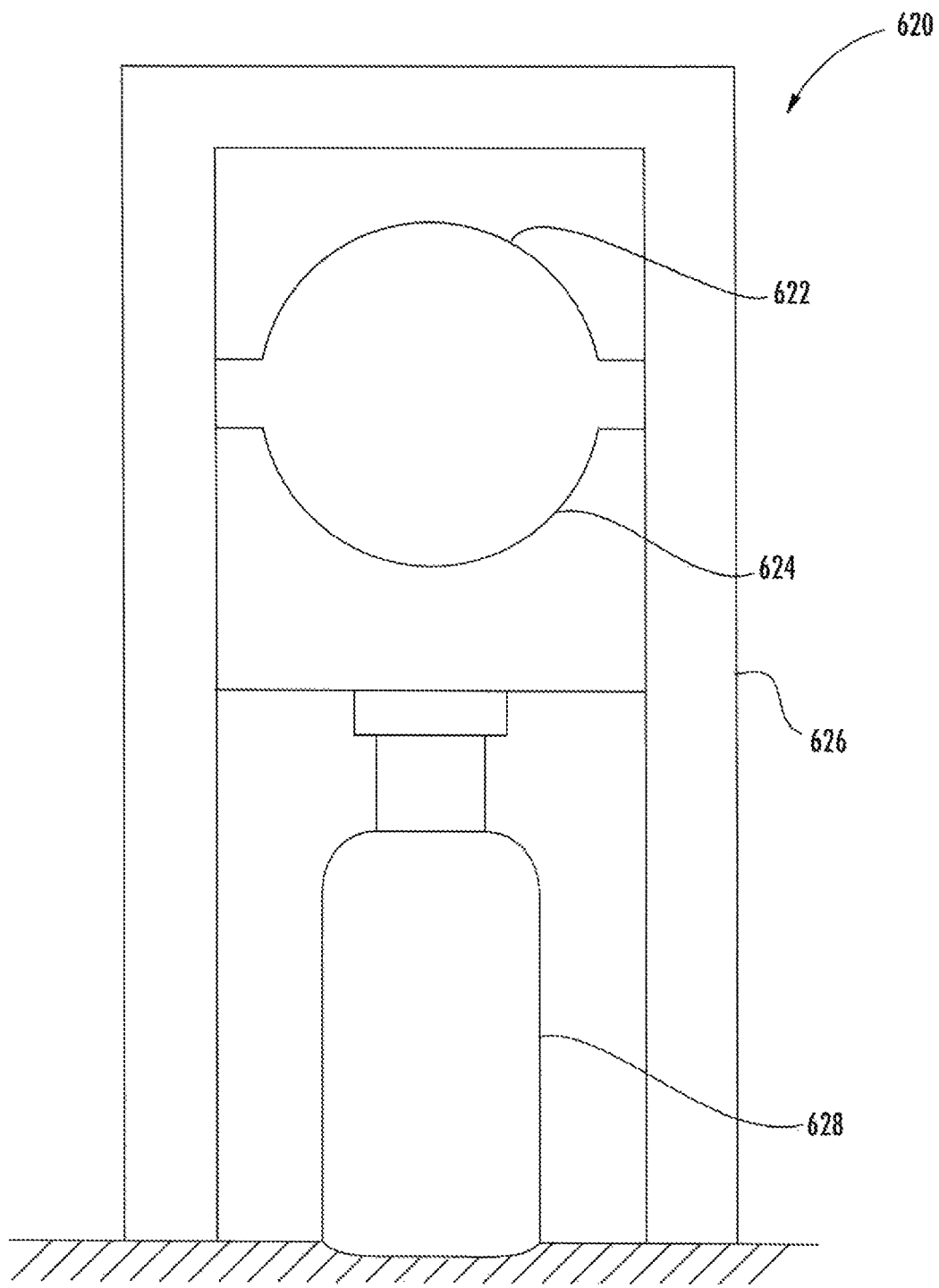
FIG. 6F is a front view of an exemplary tool for correcting out of round pipe fittings in accordance with the principles of the present invention.

Referring now to FIG. 6F, an exemplary embodiment of a tooling apparatus 620 for correcting out of round roll grooved pipe fittings is shown and described in detail. The tooling apparatus includes an upper anvil 622 and lower die 624 which includes a curved portion that is sized so as to be able to reshape a roll grooved pipe fitting back into its desired shape if the pipe fitting becomes out of round during the roll grooving process. The upper anvil remains stationary while the lower die is allowed to actuate along frame 626 using a hydraulic piston 628.

Figures 1, 6G:
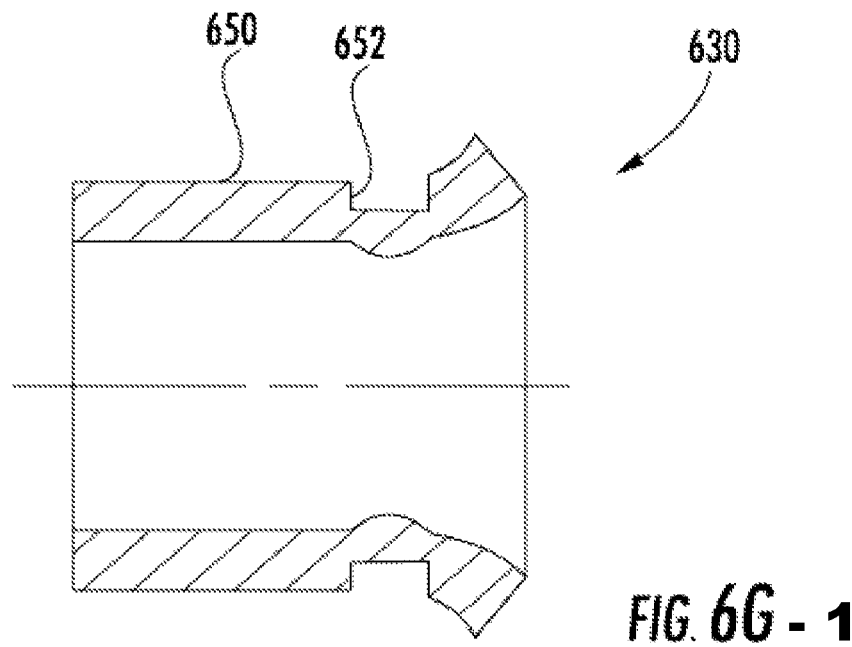
Figures 2, 6G:
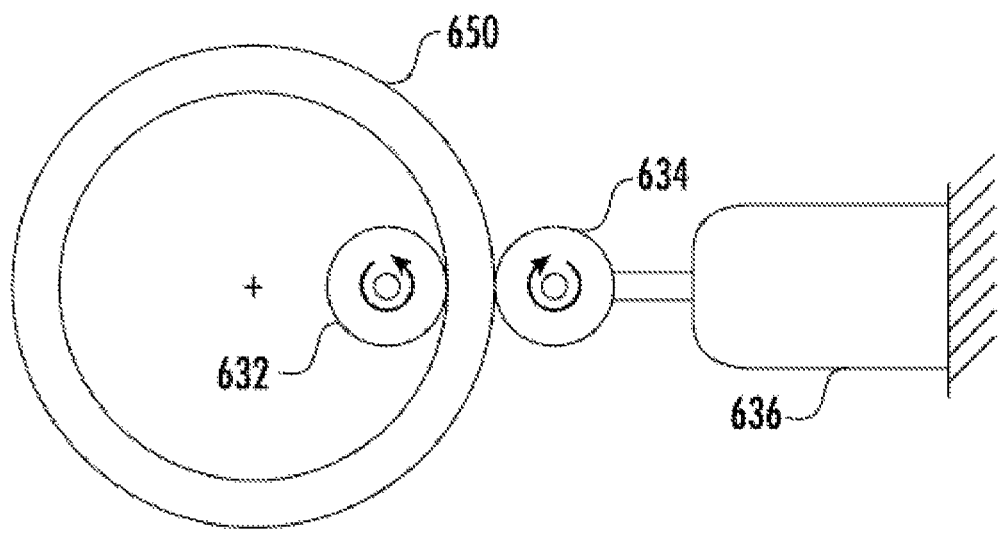

FIG. 6G-1 illustrates a typical "flare-out" condition 630 that has occurred on a pipe fitting 650 during a roll grooving operation in accordance with embodiments of the invention described herein. A flare-out occurs when the outer periphery or tail end of the pipe fitting (i.e. the portion of the pipe external to the groove 652) is deflected outward as a result of improper axial alignment during the roll grooving process. While the Assignee hereof notes that these flare-out conditions are typically within tolerance (i.e. the grooved fitting with this flare-out condition are otherwise useable), these flare-outs are undesirable aesthetically and hence can potentially be undesirably perceived by consumers. In one embodiment, and as shown in FIG. 6G-2 this flare-out condition is corrected using a freely spinning anvil 632 in combination with a die wheel 634 that is positioned against the flared out portion of the pipe fitting using a hydraulic jack 636.

Figure 6H:
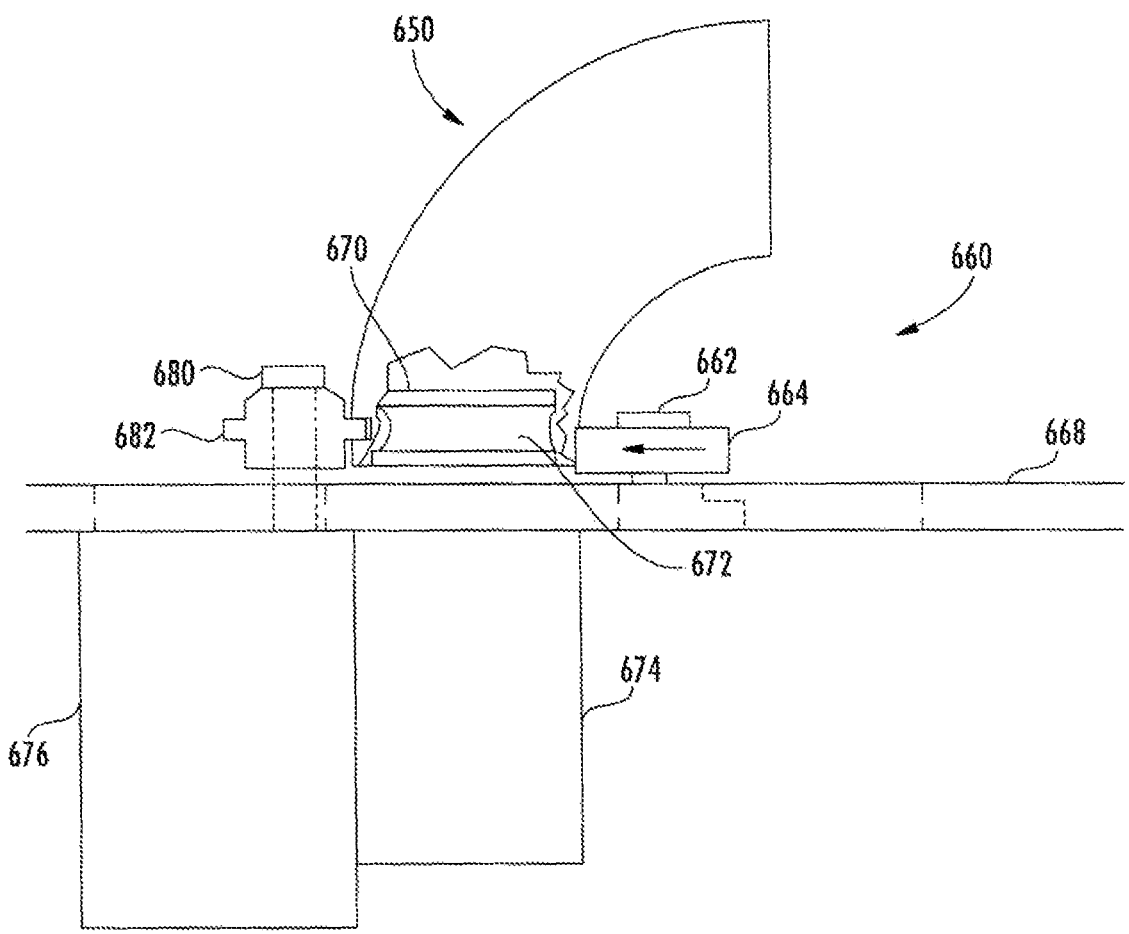
FIG. 6H is an elevation view of an alternative tool for correcting flare out conditions in accordance with the principles of the present invention.
Figure 61:
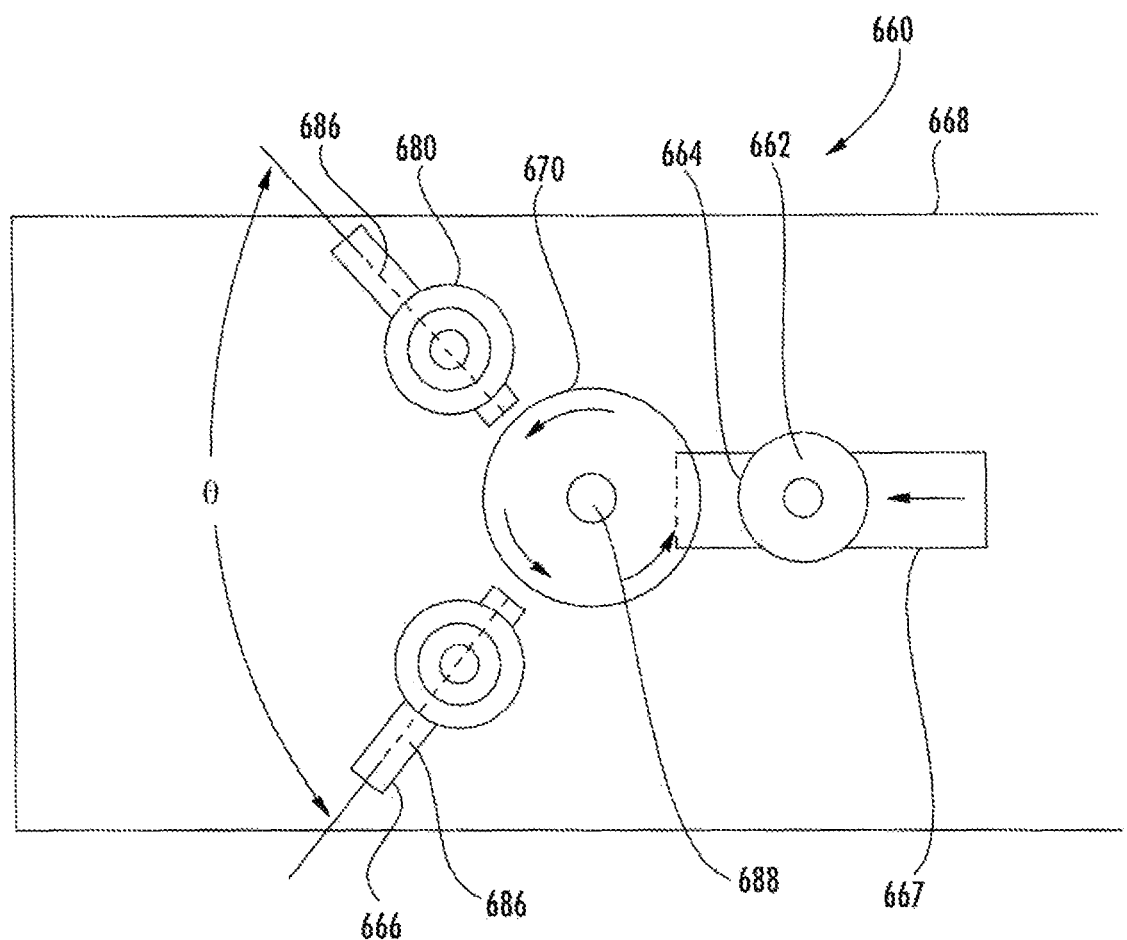

Referring now to FIGS. 6H-6I, an exemplary tool 660 for correcting flare-out conditions on a grooved fitting 650 is shown and described in detail. While a grooved elbow fitting is illustrated in FIG. 6H, it is appreciated that any grooved fitting such as, and without limitation, the tee pipe fitting illustrated in FIG. 4C, and the cross pipe fitting illustrated in FIG. 4D could also be readily corrected using the tool illustrated in FIGS. 6H-6I. The fitting is positioned over a drive wheel 670, which drives the rotation of the grooved fitting within the flare-out correcting tool 660. The drive wheel includes a relief cavity 672 which accommodates the deformed portion of the grooved fitting. The outer diameter of the drive wheel is sized so as to be just smaller than the inner diameter of the grooved fitting as measured from the deformed portion of the groove. Accordingly, the grooved fitting can simply be positioned over the drive wheel prior to the correction of the flare out condition. The drive wheel is driven by a gear reduction mechanism 674 which is in turn driven by a motor 676. In an exemplary embodiment, the motor is electrical and is sized appropriately for the grooved fittings being corrected. Furthermore, the motor will desirably include a DC variable speed motor which enables a single motor to be used on a variety of different sized fittings.

Positioned on the work surface 668 of the flare-out repair tool 660 are, in an exemplary embodiment, two (2) idler wheels 680 and a flare-out correcting pressure roller 662. In the illustrated embodiment, the flare-out correcting pressure roller 662 includes a bearing surface 664 used to straighten and align the flare out condition on the grooved fitting. The flare-out correcting pressure roller is positioned within a slot (not shown) contained within the work surface 668 and is coupled to a piston (not shown) which drives the flare-out correcting pressure roller into the flared portion of the fitting. This piston may be pneumatically or hydraulically driven. Furthermore, the flare-out correcting pressure roller will also incorporate a stop feature (not shown) which prevents the flare-out correcting roller from over-compensating the flared out portion of the grooved fitting (i.e. deforming the flared out portion past true).

The idler wheels 680, like the flare-out correcting roller, reside within similar slots on the work surface and are similarly coupled to a piston. These idler wheels also include a groove fitting portion 682. While the groove fitting portion of the idler wheels are shown positioned within the middle portion of the idler wheel, it is appreciated that it may be desirable to move the relative position of the groove fitting portion (e.g. towards the top of the idler wheel) in order to accommodate various fitting geometries and clearances. In addition, depending on the geometry of the grooved fitting to be corrected, the elevation of the idler wheels can be adjusted to accommodate various fitting geometries. As the grooved portion of the fitting acts as the geodetic datum from which the flare-out condition is measured, the groove fitting portion of the idler wheel acts to firmly couple and align the grooved fitting onto the work surface of the tool. Accordingly, by securing the grooved fitting vis-à-vis the groove, the anvil 670 and flare-out correcting roller 662 can ensure that any corrections to the flared out condition of the grooved fitting are straight and true. In addition, and similar to features described with respect to the flare-out correcting roller, the idler wheels will also incorporate stops to prevent the over-compression of the grooved fitting.

FIG. 6I illustrates a top down view of the flare-out correcting tool 660 illustrated in FIG. 6H. Specifically, the relative positioning of the idler wheels 680 with respect to the flare-out correcting die 662 are now visible. The flare-out correcting roller 662 is positioned within a respective slot 667 which enables the flare-out correcting roller to freely travel along the length of the slot. The idler wheels are disposed within respective slots 666 on an opposing side of the drive wheel 670 with the flare-out correcting tool. These idler wheels are configured to be positioned along their respective idler wheel axes 686 using pistons (as described previously herein). These idler wheel axes are separated by an angle theta (θ), which is in an exemplary embodiment about sixty degrees (60°). The angle chosen is ideally selected based on a number of factors including: (1) the diameter of the grooved fitting(s); (2) the number of idler wheels (e.g. two (2)); and (3) the diameter of the idler wheels themselves. By taking into account these various factors when choosing the angle theta (θ), various diameter grooved fittings can be corrected for flare out conditions while minimizing the components that need to be swapped out within the flare-out correcting tool 660. For example, as the idler wheels 680 travel within their slots 666 along their respective axes 686, one limiting factor for the size of the grooved fitting placed onto the tool is how close the idler wheels can get to the center point 688 of the drive wheel 670 before they interfere with one another. Accordingly, by choosing the proper angle theta (θ), an operator can use the same idler wheels for a variety of different grooved fitting sizes thereby economizing on the operation of the tool 660 by minimizing down time.

Figure 3:
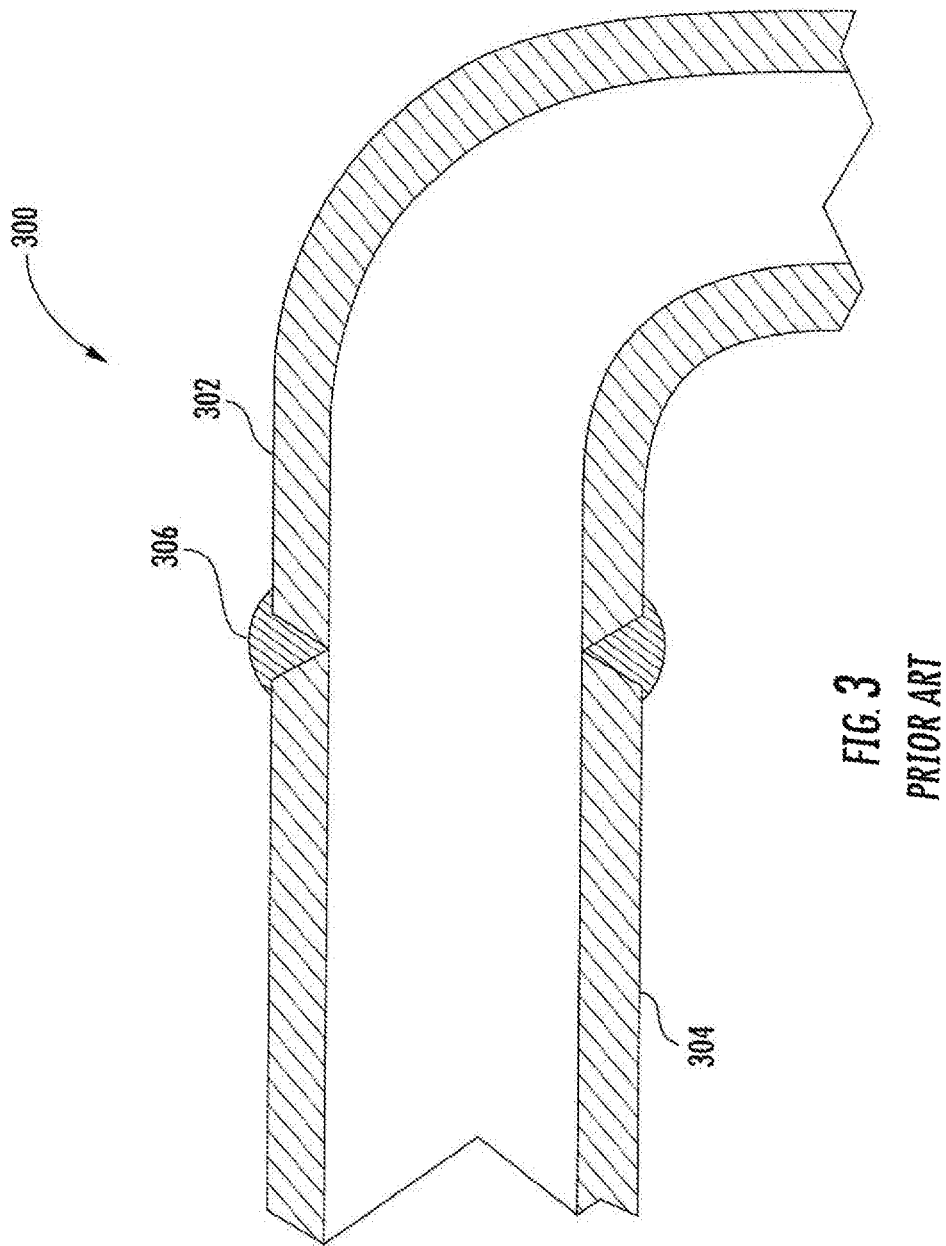
FIG. 3 is a cross-sectional view of an exemplary prior art coupled pipe fitting system using a welding process.
Figure 7:
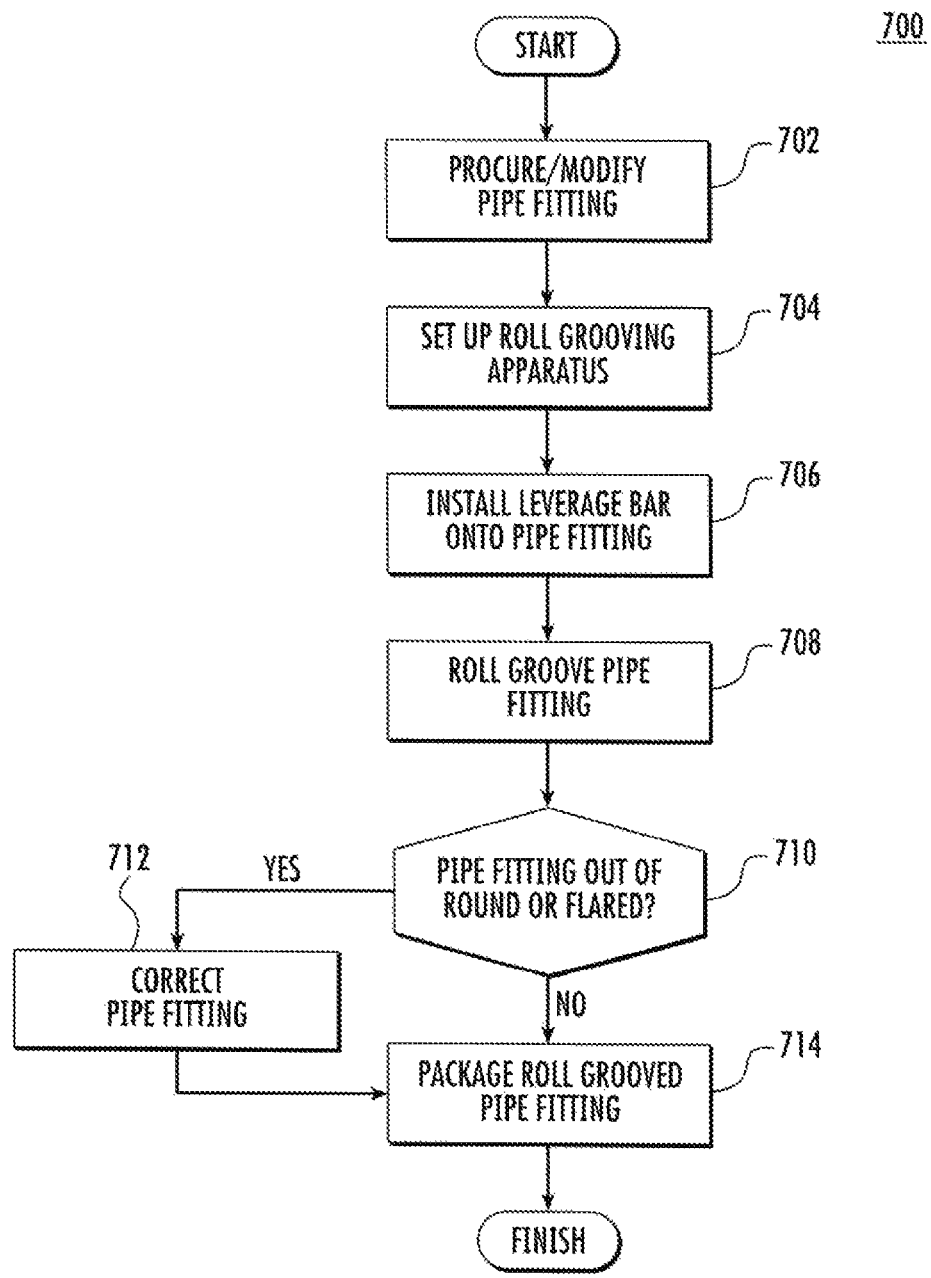
FIG. 7 is an exemplary process flow diagram for manufacturing exemplary roll grooved pipe fitting apparatus in accordance with the principles of the present invention.

Referring now to FIG. 7, an exemplary weld fitting roll grooving procedure 700 is shown. At step 702, a pipe fitting is procured and modified (if necessary). In an exemplary embodiment, the pipe fitting procured is a butt-weld carbon steel pipe fitting in accordance with ASTM A234/A234M. See for example FIG. 3 that illustrates a ninety-degree (90°) elbow 302. Using the elbow of FIG. 3 as an example, the beveled edge adjacent the weld interface is machined so as to provide a square surface for the roll grooving process.

At step 704, the roll grooving apparatus is set up. In one embodiment, the set up process includes installing a custom built backstop that is sized in accordance with the fitting to be roll grooved. The backstop is installed underneath the backup roll and aids in maintaining proper alignment of the pipe fitting during the roll grooving process. In addition, the backup roll and grooving roll is machined (if necessary) to ensure adequate clearance between any obstructing features (e.g., the radius on the elbow fitting) and subsequently installed onto the roll grooving apparatus. If the roll grooving apparatus is equipped with safety guards, these are removed and/or modified so that the pipe fitting will maintain clearance throughout the entire rotation of the fitting during the roll grooving process. The free spinning custom built idler wheel assembly (FIG. 6E) is adjusted so that it engages the gasket-seating surface of the pipe fitting, which is in an exemplary embodiment, resident about three quarters of an inch from the end of the pipe fitting.

At step 706, the leverage bar (see e.g. FIGS. 5A-6D) is installed onto the pipe fitting. In an exemplary embodiment, the leverage bar is clamped to the backside of the fitting and is sized in accordance with the underlying size and shape of the fitting. The leverage bar is then utilized by an operator so as to maintain the pipe fitting in alignment with the grooving roll and backup roll. In other words, the operator maintains the pipe fitting in an orientation in which the longitudinal axis of the rolled grooves maintains a parallel relationship with the longitudinal axis of the pipe fitting opening. The operator may accomplish this, in an exemplary embodiment, by manually controlling the amount of pressure or force being applied to the pipe fitting so as to keep it in the correct position between wheels for the part to track properly.

At step 708, the pipe fitting is roll grooved on the roll grooving apparatus. As described above, in an exemplary embodiment, the leverage bar is positioned manually by an operator who manipulates the leverage bar so as to maintain proper alignment as the pipe fitting is rotated during the roll grooving process. Alternatively, the leverage bar is utilized within an alignment apparatus (not shown) that maintains the pipe fitting properly aligned as the roll grooving apparatus rotates the pipe fitting.

At step 710, the roll grooved pipe fitting is inspected to determine whether the roll grooving process has taken the pipe fitting opening out of round or whether a flared-out condition has occurred on the edge of the pipe fitting. As previously described, a flared-out condition may occur when the outer periphery of the pipe fitting is deflected outward as a result of improper axial alignment during the roll grooving process.

If the roll grooved pipe fitting is out of round, or has flared-out, at step 712 the pipe fitting is reshaped to correct the deformation in the roll grooved pipe fitting. For example, if the pipe fitting becomes out-of-round, the fitting is placed in a press (see e.g. FIG. 6F) with interchangeable dies that are shaped according to the diameter of the fitting that matches the outer circumference of the fitting. A hydraulic press is then used in conjunction with the matched interchangeable die and the out-of-round condition is corrected. Alternatively, or in combination with correcting the aforementioned out-of-round condition, if the face of the pipe fitting is flared out, the fitting is placed in a machine that applies a force to the gasket-seating surface of the pipe fitting as it rotates via the use of a hydraulic idler wheel that engages the fitting. See for example, FIGS. 6G-6I discussed supra. The applied force created between the drive wheel (similar to the aforementioned backup wheel) and the idler wheel pushes the flare back into its original position. If the grooved pipe fitting is both out-of-round and flared, the two corrective processes can be applied in succession, i.e. correcting the out-of-round condition followed by correcting the flared out condition or vice versa.

At step 714, the roll grooved pipe fitting is packaged for shipment. In one embodiment, the packaging process begins by ensuring that the gasket-seating surface of the pipe fitting is smoothed and free from burrs. If not, this surface is processed (e.g., sanded), and all burrs are removed. Next, a protective end cap is placed onto the end of the fitting before placed into its packaging for shipment. In an exemplary embodiment, the protective end cap and/or finished fitting is marked with the company's name, and other pertinent information. In addition, each roll grooved fitting will carry the original manufacturer specifications that are typically stamped into the fitting by the original manufacturer of the part. The fitting is now ready for resale to distributors, vendors and companies.

Methods of Use

Figure 8A:
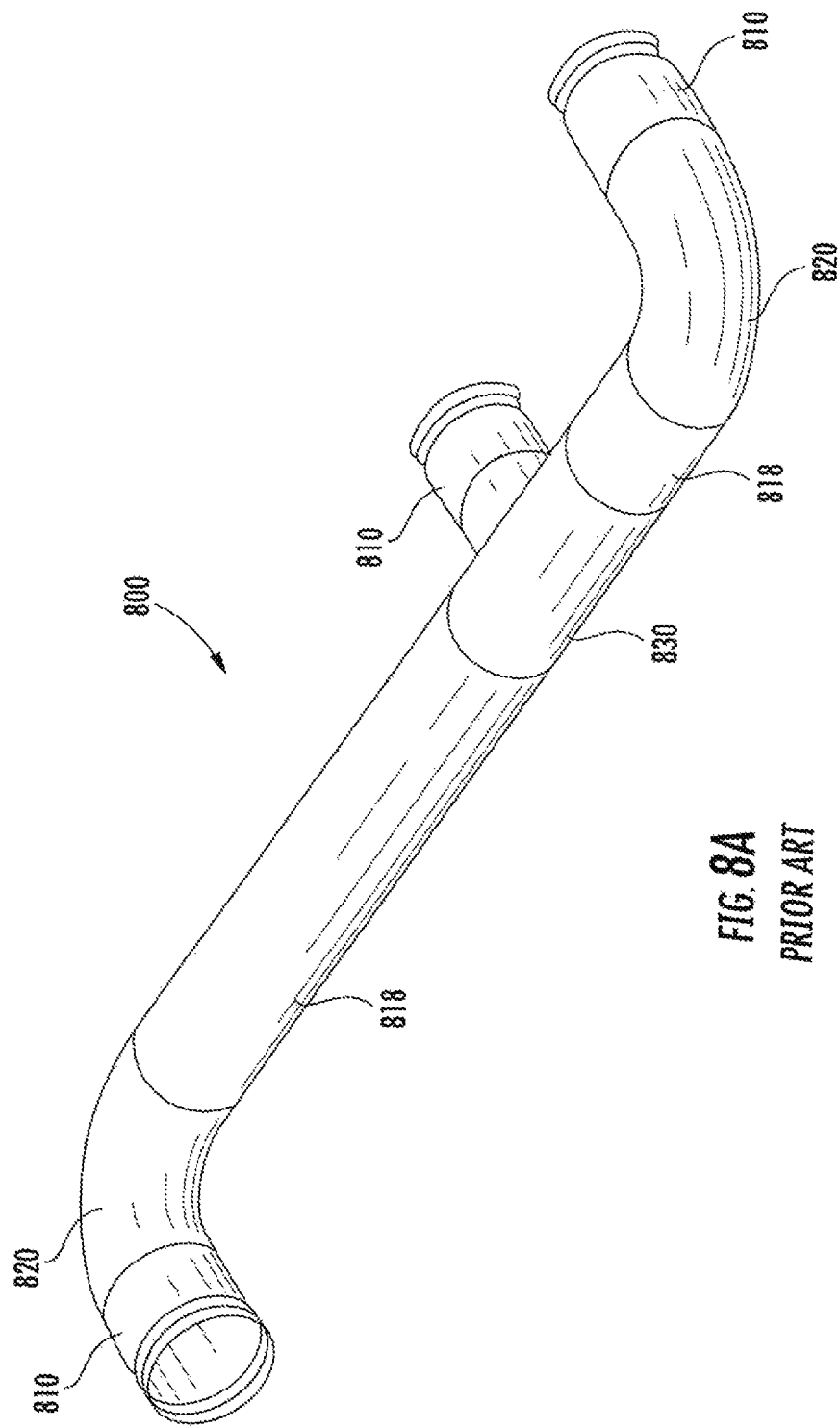
FIG. 8A is a perspective view of a first exemplary prior art hybrid piping system.

Referring now to FIG. 8A, a first exemplary hybrid system 800 as it exists in the prior art is illustrated. Specifically, the hybrid system illustrated in FIG. 8A includes a couple of types of fittings 820, 830 joined together via welds to standard steel straight lengths of pipe 818. In an exemplary embodiment, these standard straight lengths of pipe comprises six-inch diameter standard carbon steel pipe 818, while the elbows comprise six-inch diameter standard ninety degree (90°) carbon steel elbow fittings 820 along with a standard carbon steel tee fitting 830. In order to attach such a system to other lengths of standard carbon steel pipe via a mechanical (grooved) connection, short lengths of carbon steel 810, with grooves added to one end, are often added in order to join the welded portions of the system to the mechanically attached portions of the system.

Figure 8B:
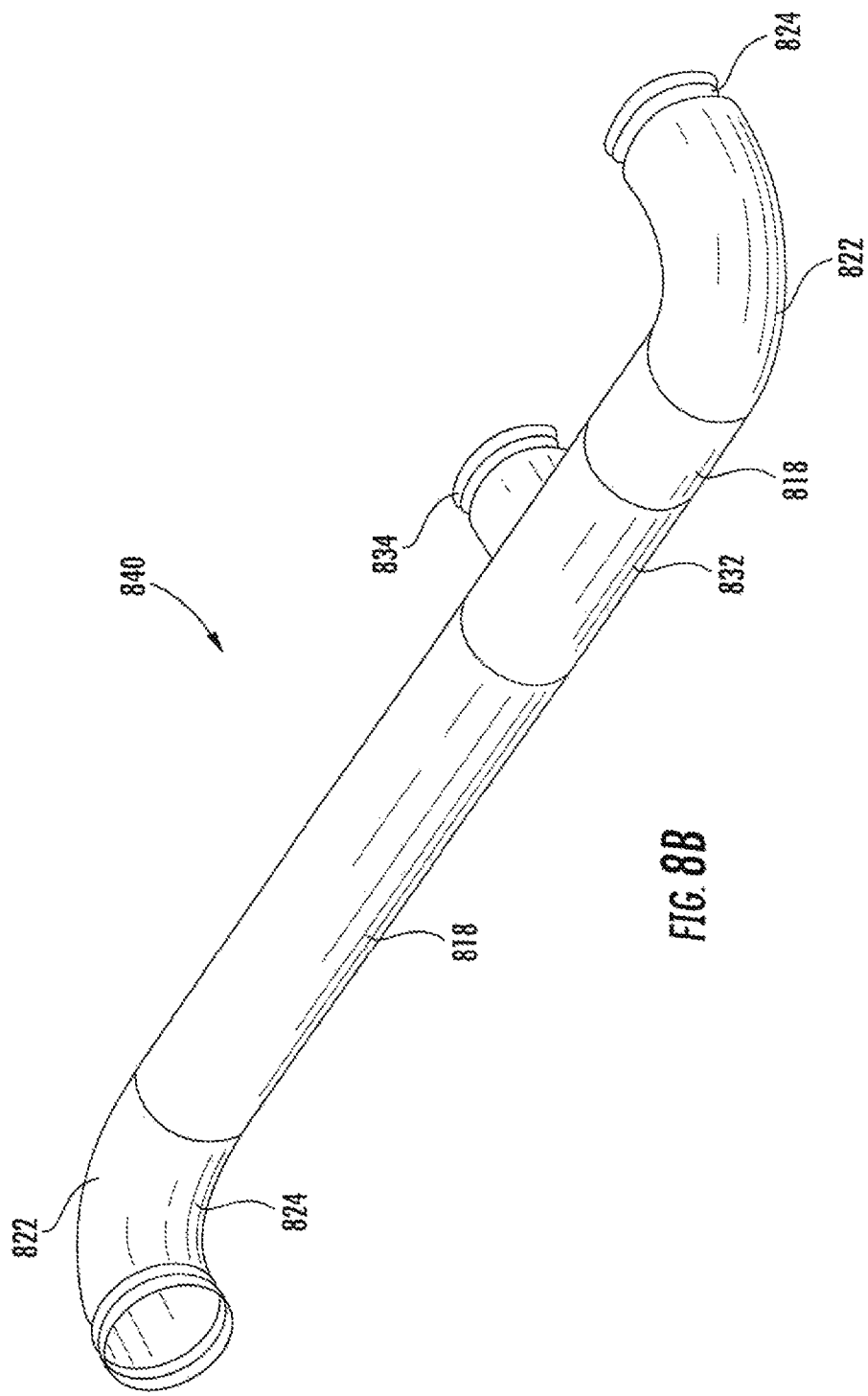
FIG. 8B is a perspective view of a variant of the hybrid piping system of FIG. 8A in accordance with the principles of the present invention.

FIG. 8B illustrates an exemplary hybrid system 840 that is similar to that shown in FIG. 8A, except that it utilizes the grooved pipe fitting embodiments described previously herein. Specifically, the short lengths of carbon steel pipe which were added in FIG. 8A can now be obviated as the grooves 824, 834 can be incorporated directly onto the elbow fittings 822 and tee fitting 832, respectively. Accordingly, for this small sample section of a hybrid system 840, three (3) cuts and three (3) welds no longer need to be performed thereby substantially reducing system complexity and assembly time. Additionally, this not only results in a more streamlined assembly process, but also results in the ability to make smaller turns and offsets over prior art techniques. Such a system is also particularly useful in areas where the amount of space for running pipe is limited.

Figure 8C:
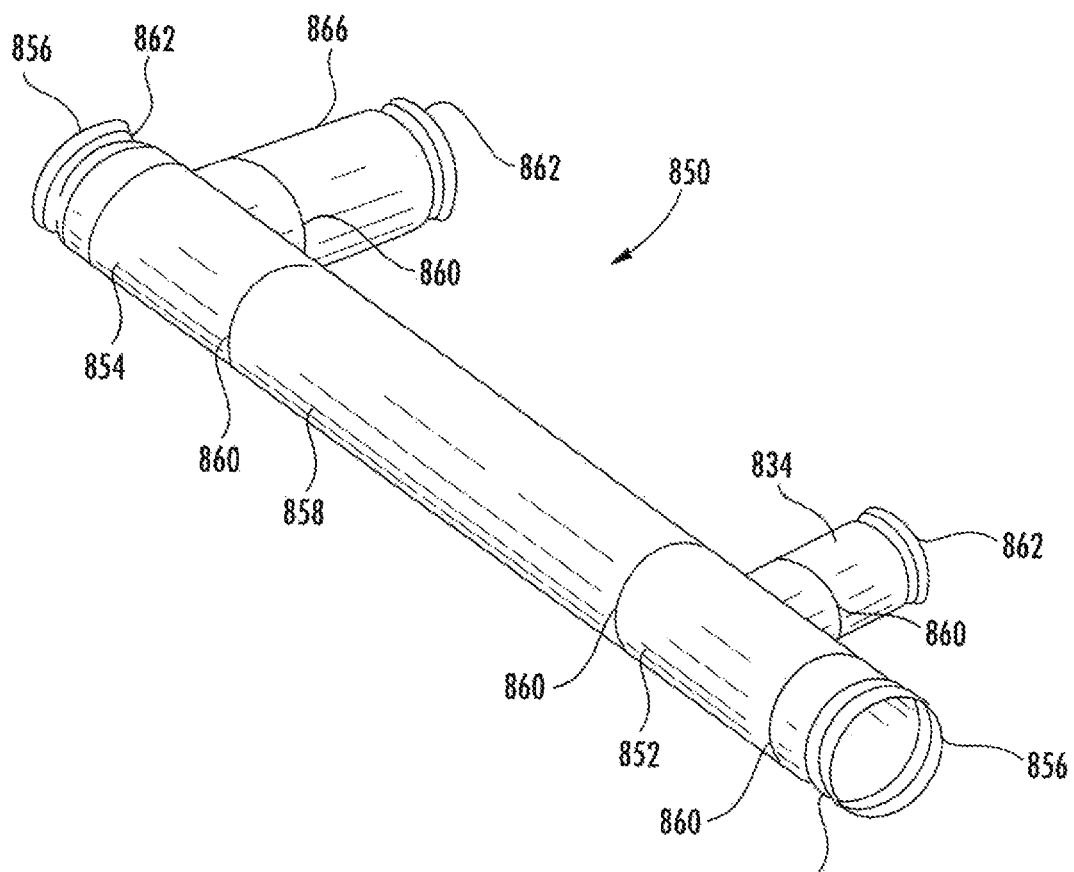
FIG. 8C is a perspective view of a second exemplary prior art hybrid piping system.

FIG. 8C illustrates an alternative hybrid system 850 as it exists in the prior art. In one embodiment, the hybrid system of FIG. 8C includes ten-inch standard carbon steel pipe 856, 858, 866; eight-inch standard carbon steel pipe 864; a ten-inch standard carbon steel tee 854; and a ten-inch by eight-inch standard carbon steel reducing tee 852. The hybrid system includes welded joints 860 as well as grooved joints 862. However, again, relatively short lengths of carbon steel pipe 856, 866 and 864 need to be added in order to join the welded portions of the system to the mechanically joined portions of the system.

Figure 8D:
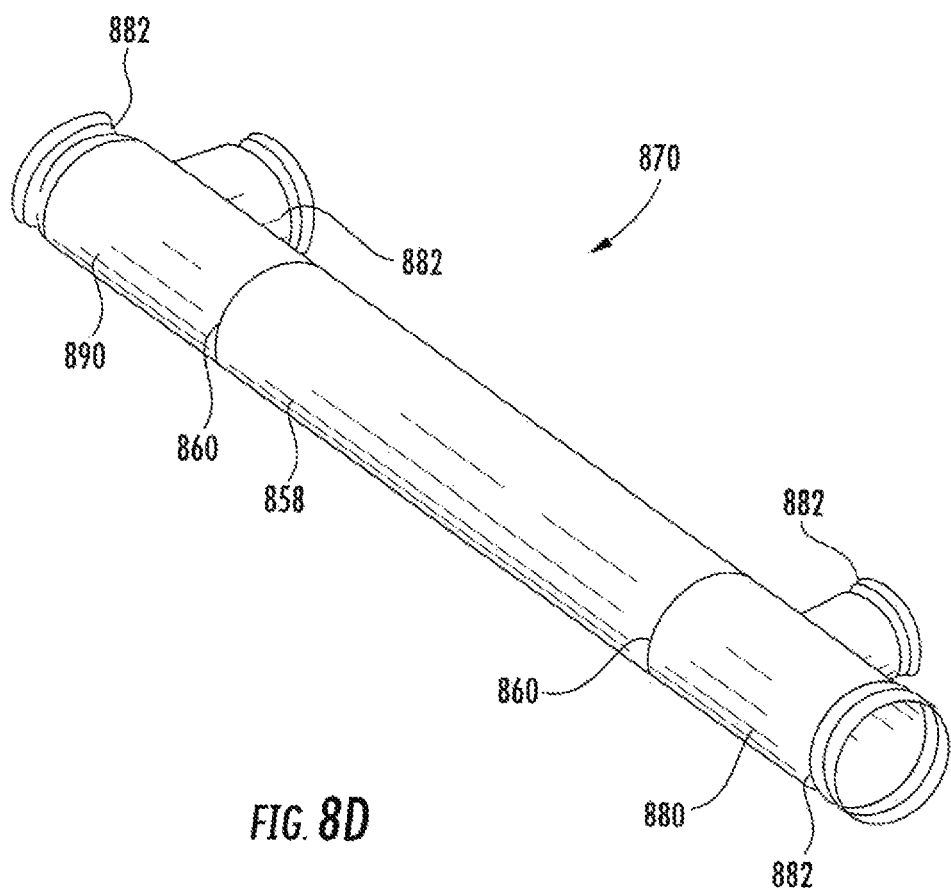
FIG. 8D is a perspective view of a variant of the hybrid piping system of FIG. 8C in accordance with the principles of the present invention.

FIG. 8D illustrates an exemplary hybrid system 870 that is similar to that shown in FIG. 8C, except that it now incorporates the grooved pipe fitting embodiments described previously herein. Specifically, the short lengths of carbon steel pipe which were added in FIG. 8C are now obviated as the grooves 882 are incorporated directly onto the fittings 880, 890 themselves. Accordingly, for this small section of a hybrid system 870, four (4) cuts and four (4) welds no longer need to be performed thereby substantially reducing system complexity and assembly time. Similar to the embodiment illustrated in FIG. 8B, this not only results in a more streamlined assembly process, but also incorporates the ability to make smaller offsets, over prior art techniques.

It can be appreciated that while certain aspects of the invention have been described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of manufacturing a roll-grooved forged carbon steel fitting, the method comprising:
    obtaining a forged carbon steel fitting, the forged carbon steel fitting comprising a tubular structure having one or more bends associated therewith;
    placing the forged carbon steel fitting onto a roll grooving apparatus;
    installing a leverage bar onto the forged carbon steel fitting; and
    roll-grooving the forged carbon steel fitting in order to produce the roll-grooved forged carbon steel fitting;
    wherein the installing of the leverage bar onto the forged carbon steel fitting comprises installing the leverage bar such that a portion of the leverage bar rotates about an axis that is collinear with an axis of rotation for the roll grooving apparatus.

2. The method of claim 1, further comprising modifying the obtained forged carbon steel fitting prior to the placing, the modifying comprising removing a beveled edge adjacent to an opening of the tubular structure.

3. The method of claim 1, wherein prior to the placing, installing a custom backstop onto the roll grooving apparatus.

4. The method of claim 1, further comprising manipulating the leverage bar to maintain alignment during the roll-grooving.

5. The method of claim 4, further comprising inspecting the roll-grooved forged carbon steel fitting, subsequent to the roll-grooving, in order to determine out of round and/or a flared-out condition.

6. The method of claim 5, wherein when the inspecting reveals the out of round and/or the flared-out condition, re-shaping the roll-grooved forged carbon steel fitting.

7. The method of claim 6, wherein the re-shaping of the roll-grooved forged carbon steel fitting comprises using a flare-out correcting tool in order to correct the out of round and/or the flared-out condition.

8. A method of manufacturing a roll-grooved forged carbon steel fitting, the method comprising:
    obtaining a forged carbon steel fitting, the forged carbon steel fitting comprising a tubular structure having one or more bends associated therewith;
    placing the forged carbon steel fitting onto a roll grooving apparatus;
    installing a leverage bar onto the forged carbon steel fitting; and roll-grooving the forged carbon steel fitting in order to produce the roll-grooved forged carbon steel fitting;

wherein the installing of the leverage bar onto the forged carbon steel fitting comprises securing the leverage bar adjacent to a peripheral opening of the forged carbon steel fitting.

9. The method of claim 8, further comprising modifying the obtained forged carbon steel fitting prior to the placing, the modifying comprising removing a beveled edge adjacent to an opening of the tubular structure.

10. The method of claim 8, wherein prior to the placing, installing a custom backstop onto the roll grooving apparatus.

11. The method of claim 8, further comprising manipulating the leverage bar to maintain alignment during the roll-grooving.

12. The method of claim 11, further comprising inspecting the roll-grooved forged carbon steel fitting, subsequent to the roll-grooving, in order to determine out of round and/or a flared-out condition.

13. The method of claim 12, wherein when the inspecting reveals the out of round and/or the flared-out condition, re-shaping the roll-grooved forged carbon steel fitting.

14. The method of claim 13, wherein the re-shaping of the roll-grooved forged carbon steel fitting comprises using a flare-out correcting tool in order to correct the out of round and/or the flared-out condition.

15. A method of manufacturing a roll-grooved forged carbon steel fitting, the method comprising:

obtaining a forged carbon steel fitting, the forged carbon steel fitting comprising a tubular structure having one or more bends associated therewith;

placing the forged carbon steel fitting onto a roll grooving apparatus;

installing a leverage bar onto the forged carbon steel fitting; and roll-grooving the forged carbon steel fitting in order to produce the roll-grooved forged carbon steel fitting;

wherein the installing of the leverage bar onto the forged carbon steel fitting comprises securing the leverage bar to a central location of the forged carbon steel fitting, the central location being disposed away from open apertures for the tubular structure.

16. The method of claim 15, further comprising modifying the obtained forged carbon steel fitting prior to the placing, the modifying comprising removing a beveled edge adjacent to an opening of the tubular structure.

17. The method of claim 15, wherein prior to the placing, installing a custom backstop onto the roll grooving apparatus.

18. The method of claim 15, further comprising manipulating the leverage bar to maintain alignment during the roll-grooving.

19. The method of claim 18, further comprising inspecting the roll-grooved forged carbon steel fitting, subsequent to the roll-grooving, in order to determine out of round and/or a flared-out condition.

20. The method of claim 19, wherein when the inspecting reveals the out of round and/or the flared-out condition, re-shaping the roll-grooved forged carbon steel fitting; and wherein the re-shaping of the roll-grooved forged carbon steel fitting comprises using a flare-out correcting tool in order to correct the out of round and/or the flared-out condition.

\* \* \* \* \*